Figure 2A:
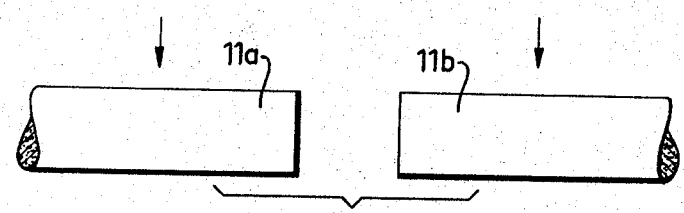
Figure 2B:
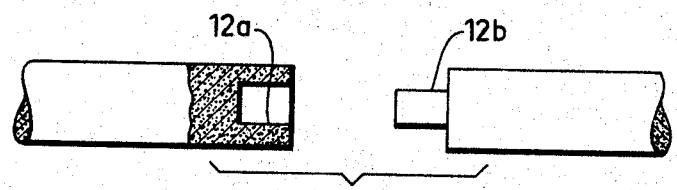
Figure 2C:
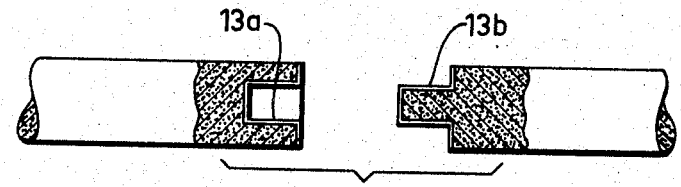
Figure 2D:
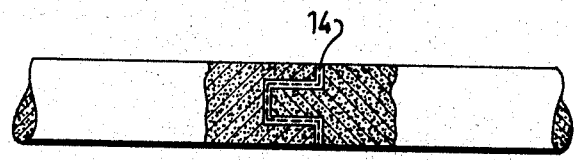
Figure 2E:
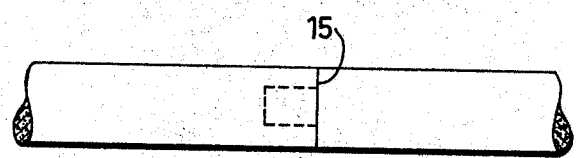

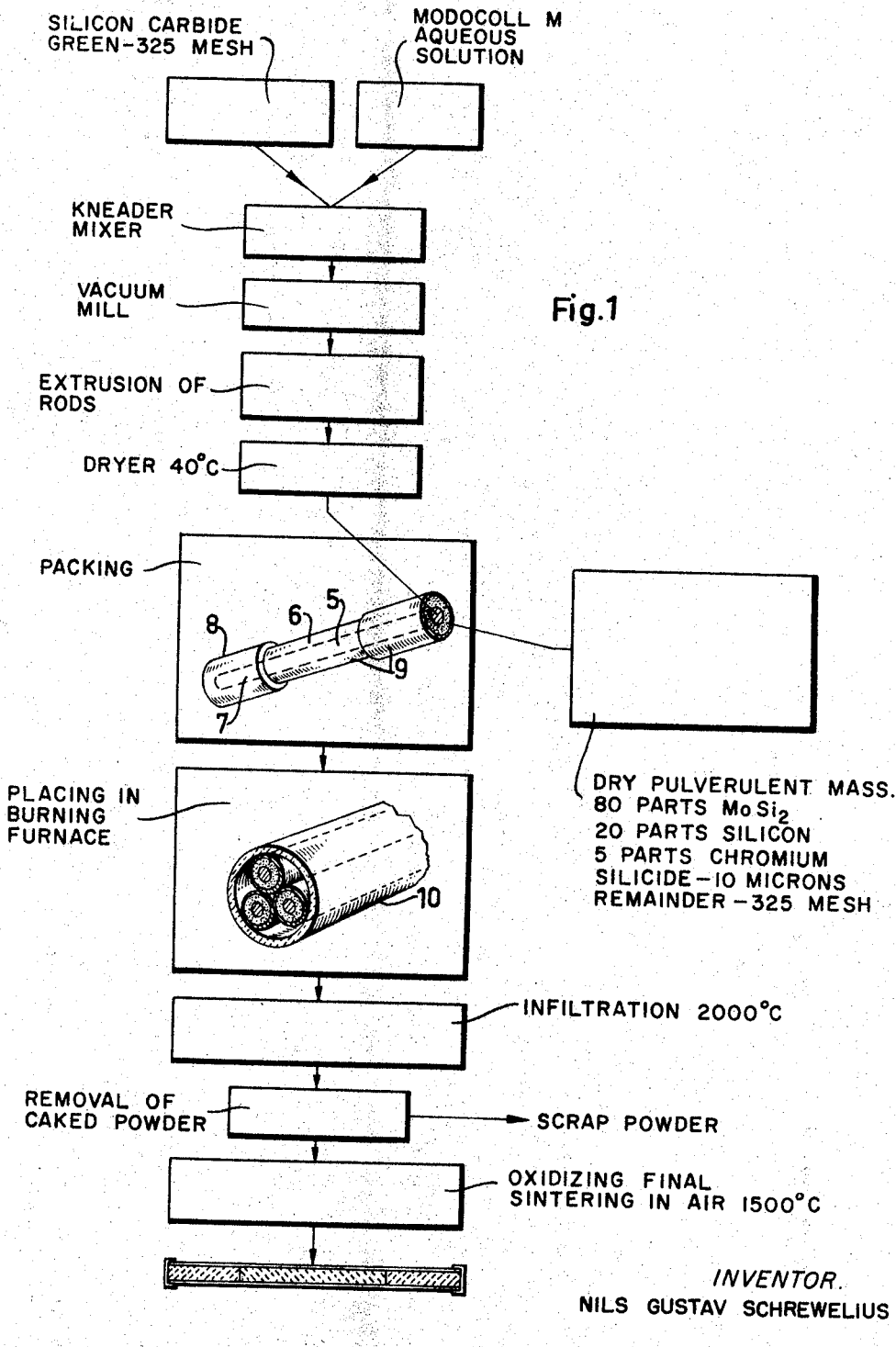

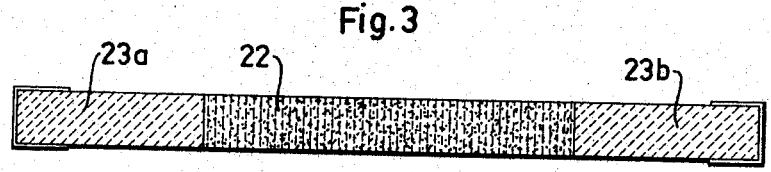
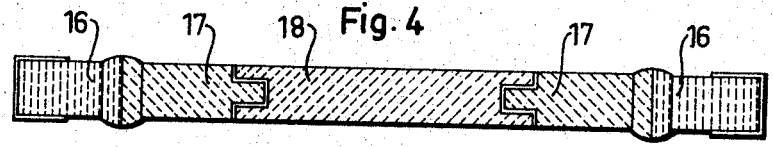
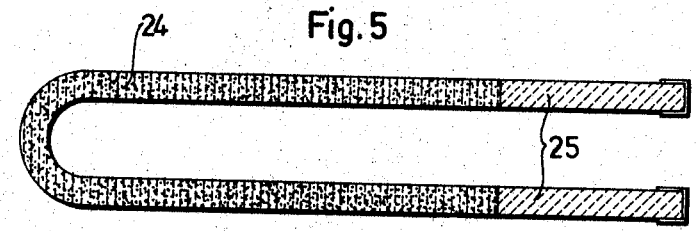
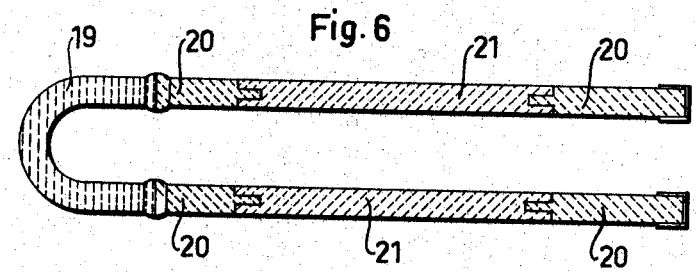

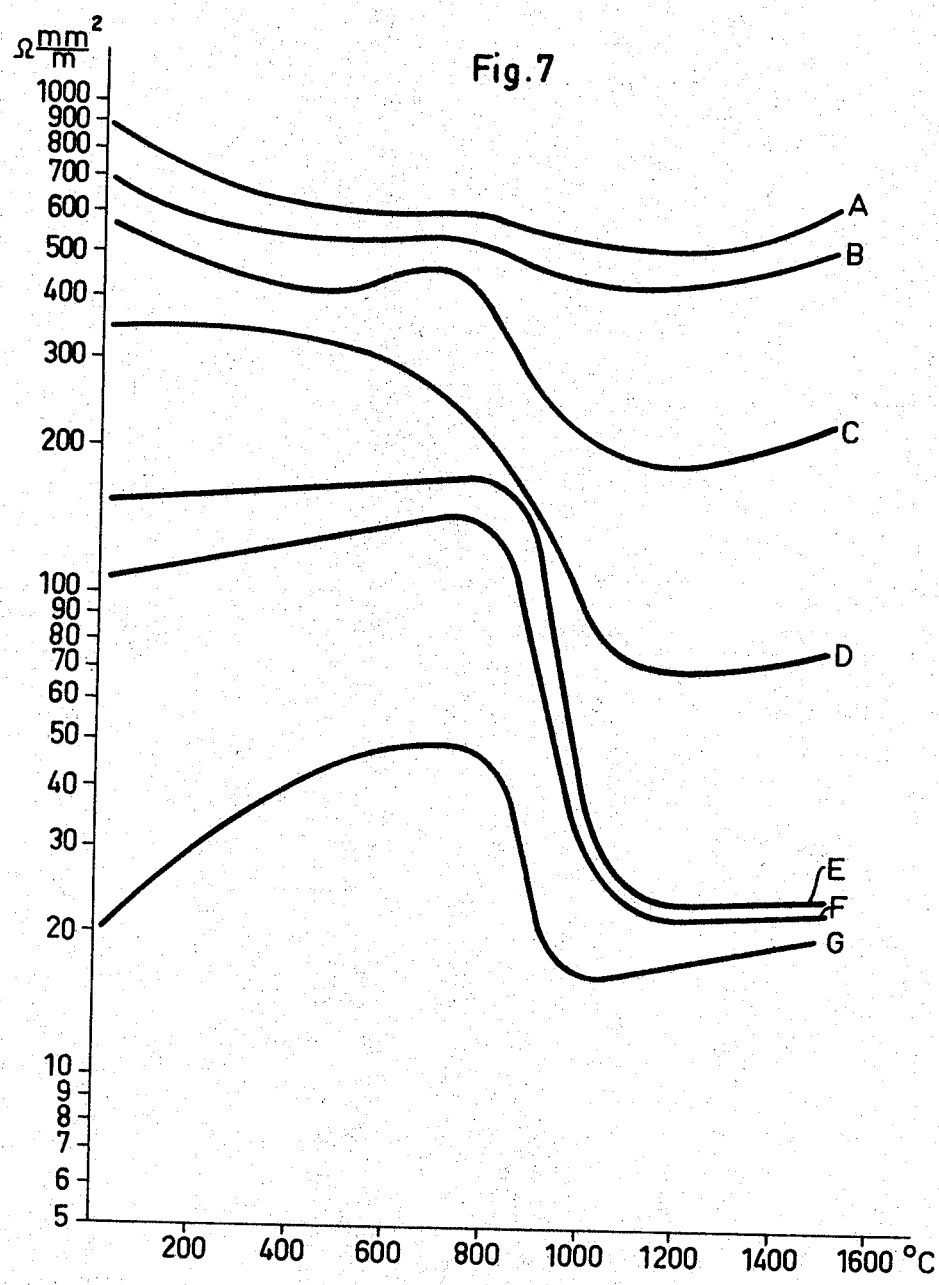

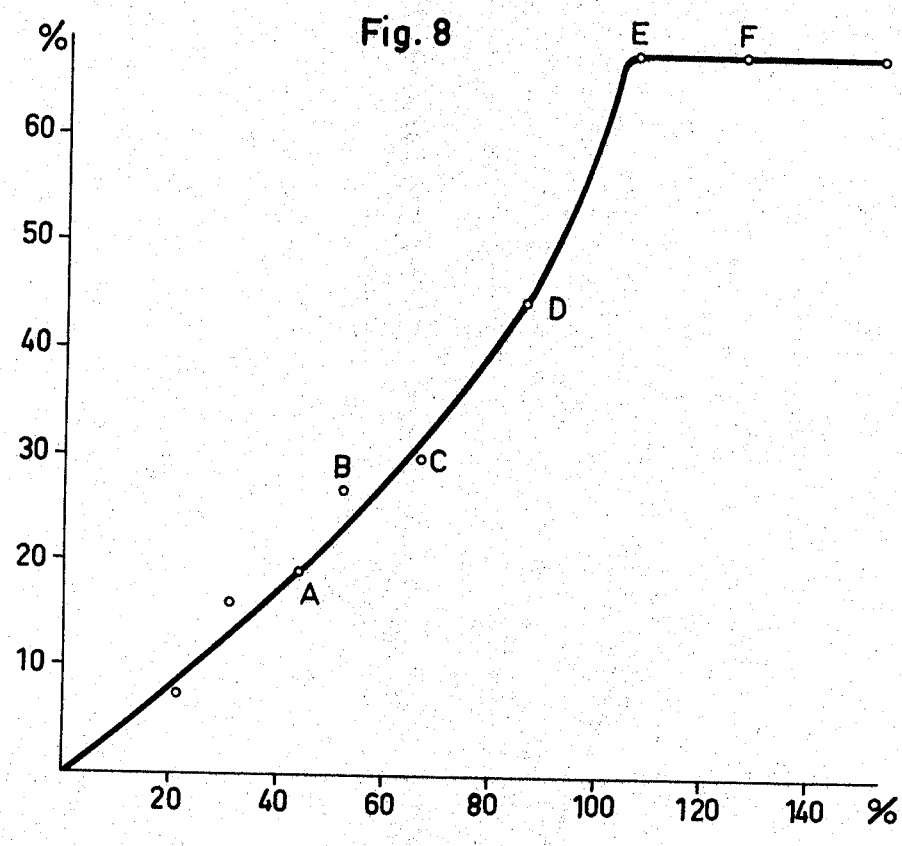

United States Patent Office 3,321,727
Patented May 23, 1967

3,321,727
HEAT-RESISTANT AND OXIDATIONPROOF
MATERIALS
Nils Gustav Schrewelius, Hallstahammar, Sweden,
assignor to Aktiebolaget Kanthal, Hallstahammar,
Sweden
Continuation of abandoned application Ser. No. 64,833,
Oct. 25, 1960. This application Dec. 9, 1964, Ser. No.
417,197
14 Claims. (Cl. 338—330)

The present invention relates to new and useful materials of the class essentially comprising silicides and methods of making such materials.

This application is a continuation of my copending application Ser. No. 64,833 filed Oct. 25, 1960 (now abandoned) which is a continuation-in-part of my copending applications Ser. Nos. 806,178 (now United States Patent 3,036,017) and 6972 (now abandoned) filed Apr. 13, 1959 and Feb. 5, 1960, respectively. Said Ser. No. 806,178 is in turn a division of Ser. No. 434,124 filed June 3, 1954, and now abandoned.

Some of the silicides of the transition elements of the fourth, fifth and sixth groups in the periodic system of chemical elements possess high melting points, high hardness and good resistance to corrosion. Silicon carbide SiC acts in many respects as a silicide and has since long been used commercially as a heat-resistant and oxidationproof material. In particular, the excellent resistance to oxidation at high temperatures inherent in metallic silicides has, of late years, gained an increased interest. The production of objects for practical use from silicides may be carried out in accordance with conventional ceramic or powder-metallurgical methods. The principal weakness involved in such products resides in the brittleness characteristic of intermediate phases. From the point of view of mechanical strength the metallic silicides are to be considered as comparable with ceramics, and as such they are thus in lack of plastical ductility at room temperature, but possess a softening temperature characteristic of each compound of the class and being in respect of, for instance, $MoSi_2$ about 1500° C. At this temperature the silicide will have imparted to it a certain degree of softness rendering the same susceptible to a slight degree of plastical shaping. The grain growth occurring in the silicide at this temperature will give rise to a brittleness which makes impossible any further plastical shaping. On the other hand, silicon carbide does not shown any plastic ductility at any temperature and does also not have the ability of sintering whereby the manufacture of dense selfbonded bodies of SiC is extremely difficult.

It has been found by applicant that useful heat-resistant and oxidationproof bodies can be obtained by adding to the metal silicides a suitable amount of silicon carbide of a suitable grain size. As a matter of fact, it has been found, quite unexpectedly, that an admixtion of silicon carbide into silicides results in a heat-resistant material of highly improved characteristics. In the following description the compositions, the physical properties and the methods of manufacture of the new materials will be disclosed in a number of sections. Particular attention will be directed to the important roll played by the particle size and the existence of oxide on the surface of the particles when pressing and sintering the starting material. Then two novel methods to make the new materials will be described, the one method being based on the formation of silicon carbide in situ by a special carburization reaction and the second method being an infiltration process based on the observation that porous silicon carbide bodies may be infiltered by molten heat-resistant silicides provided the latter contain an excess of silicon. In special sections there will be described the properties of the preliminary porous bodies, the carrying out of the infiltration and the rules governing the compositions of the infiltered alloys.

On the accompanying drawings illustrate

Figure 9:
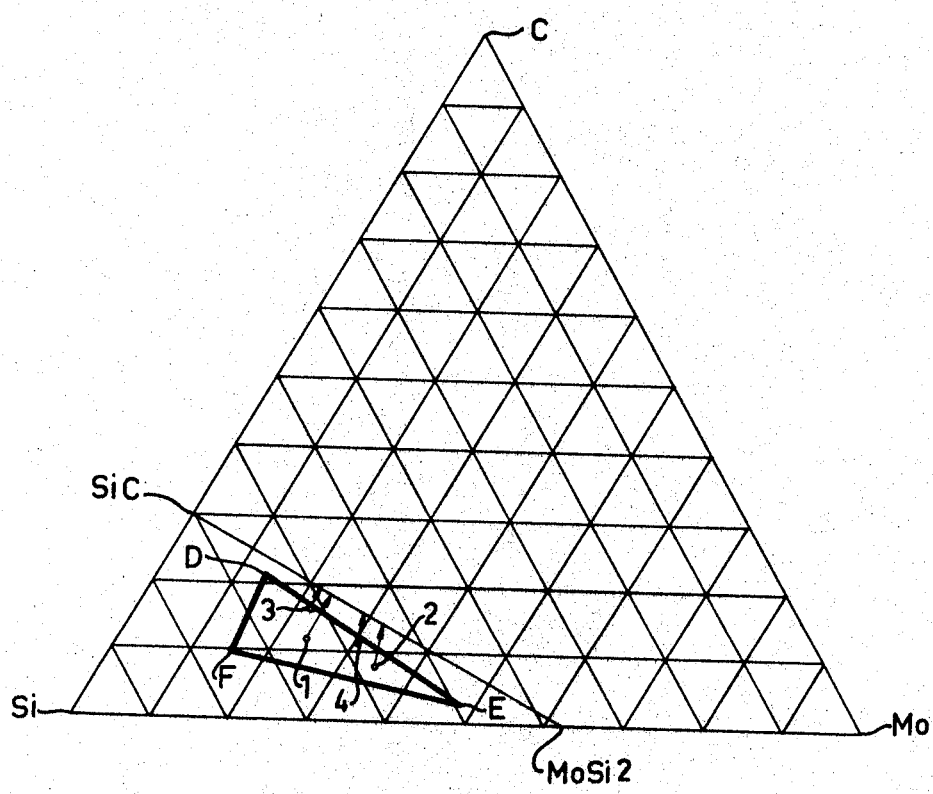

FIG. 1 a flow diagram in the manufacture of an electric heating element by infiltration, FIGS. 2A to 2E, inclusive, show diagrammatically the steps in joining two infiltered bodies having different compositions, FIGS. 3 to 6 different types of electric elements, FIG. 7 diagrams for the specific electric resistance as a function of temperature in elements of different compositions, and FIG. 8 a diagram for the quantity of absorbed alloy as a function of different quantities of alloy used in infiltration of porous shaped bodies, and FIG. 9 a triangular diagram indicating the chemical changes during the carburization of molybdenum silicide rich in silicon.

Section 1.—Chemical compositions of materials

The silicide material is composed, according to the present invention, of a metal silicide and silicon carbide, the latter constituting 30 to 90% by volume and said metal silicide 10 to 70% by volume of the solid material.

According to a further development of the invention, the characteristics of the heat-resistant material may be modified by adding up to 20% by volume of one or more oxides. The oxides can form a mixture of oxides or a solid solution of, or chemical compounds of oxides. According to this invention, the mixed oxide may contain oxygen compounds of at least one of the metals Al, Be, Ce, Cr, Hf, Mg, Ti, Si, Zr, Th, Y and other rare earth metals. From these metals, Si, Zr, Be, Al, Th and Ce are those which will mainly come into consideration. In addition to these metals small amounts of others may be added in order to modify or stabilize the oxide, or to alter its electrical or other characteristics. From several points of view an oxide of substantially $SiO_2$ forming up to 10% by volume of the solid heat-resistant material may be advantageous in certain cases. Such addition of oxide involves changes in the electrical characteristics in that it increases the electrical resistivity. In addition, the thermal dependence of the latter resistivity coefficient will change. In certain cases it may be advantageous, by varying the contents of silicon carbide, metal silicide, and oxide, respectively, to impart to the heat-resistant material the electrical characteristics aimed at in any particular case. Since, on the other hand, any addition of oxides will act to impair the durability of the material in respect of both mechanical and thermal shocks, due to the usually low thermal conductivity of the oxides and their brittleness in the cold state, it is of advantage to be able to adjust the additions for modifying the electrical characteristics in such a manner that the impairing influence of the oxides will be compensated for by the improving effect of the silicon carbide. In this way it will be possible to maintain, or even to improve the shock-resistance of the pure silicides in spite of oxidic materials having been introduced therein.

The presence of an oxide component, for instance, quartz glass in bodies of silicon carbide and heat-resistant silicide has an important influence on the physical properties of said bodies. An important instance of this type is the case when porous bodies of SiC together with silicide are heated in air while quartz glass is being formed. This glass will then partially form a film on the surface of the body and partially seal the pores in the body more or less. It could be expected that such a body, for instance, of SiC and $MoSi_2$ filled out with quartz glass would be very resistant against oxidation. This is also the case at moderate temperatures and also at high temperature provided the temperature is maintained constant. At repeated temperature shocks and very high temperatures such as more than 1500° C. in air it has been found, however, that bodies containing quartz glass will be subjected to an oxidation which is comparatively small but in certain cases still may be detrimental. For electric resistance elements subjected to severe stresses at high temperature even a small oxidation causes an increase in electric resistance which, after the lapse of a long time, will be cumbersome. In practical tests it has been found that this slow increase in resistance is rather constant independent of the quantity of quartz glass present. Only when all of the quartz glass is on the surface of the element, i.e. when there are no pores filled with quartz glass in the body, the elements will be entirely free from any increase in resistance even after being operated for several thousand hours at a temperature of up to 1550° C. It may be assumed that the incapacity of the quartz glass to shut out the air oxygen entirely has some connection with the fact that the diffusion of oxygen in hot quartz glass is considerable in comparison with its diffusion in SiC or $MoSi_2$. The present invention comprises thus as an important embodiment methods to manufacture such bodies which are entirely devoid of pores, at least throughgoing pores, and which consist solely of SiC and heat-resistant silicide and which will accordingly, upon being heated in air, for instance, at 1500° C., contain quartz glass exclusively in the form of a very thin exterior film.

The proportional relation between the contents of silicide and silicon carbide in the heat-resistant material is of essential importance in respect of the characteristics intended to be attained. Since silicide as well as silicon carbide each display very good heat-resistance properties it is to be expected that all materials containing these two main components will display a good heat-resistance. This has also been found to be true. It has been found that even moderate amounts of silicide may have the effect of essentially improving, inter alia, the resistance of silicon carbide to oxidation at temperatures above 1300° C. Therefore, the invention covers materials with a silicon carbide content of 30 to 90% by volume.

The metal silicide consists of up to 90% by weight of one or more metals of a group consisting of the metals W, Mo, Cr, Ta, Nb, V, Hf, Zr or Ti, together with up to 30% by weight of one or more elements of a group consisting of the metals Al, Be, Ca, Ce, Co, Cu, Mg, Fe, Mn and Ni, and the elements C and B. In the metal silicide used the Si content should normally be high in order to render the silicide resistant to oxidation, and the applicants have found that the Si content of the mixed silicides concerned should be at least 10% by weight. At lower contents than this the Si content will not be sufficient to be able to form an adequate protective layer of $SiO_2$ on the grain surfaces. Furthermore, applicant has found that the Si content should not exceed 70% by weight because, at higher Si contents, the melting point will be so low that the mixed silicide will be unusable for practical purposes. As a matter of fact, the melting point of the metal silicide in its state of equilibrium should be considerably higher than the designed operating temperature of the finished composition.

Comprised within the scope of the invention are all combinations of the above silicides with silicon carbide and, in relevant cases, together with one or more oxides. However, as stated in the foregoing, $MoSi_2$ has a particular interest directed to it owing to the particularly satisfactory results attained with heat-resistant materials containing the same in combination with silicon carbide. To summarize, the metal silicide should constitute from 10 to 70%, the silicon carbide from 30 to 90% and the oxide from 0 to 20% by volume of the body.

*Section 2.—Physical properties of bodies containing silicon carbide and $MoSi_2$*

The various characteristics which are essential in respect of a heat-resistant material are, i.e., the following: resistance to corrosion, particularly in respect of oxygen at elevated temperatures; high tensile strength up to high temperatures; resistance to heat-shocks, elasticity, resistance to mechanical shocks or impacts (brittleness), softening temperature, ductility when subjected to heat, grain growth and consequent deterioration of its strength when maintained at elevated temperatures for long periods of time. For electrical resistance materials and abrasives further specific characteristics are required, such as in respect of its electrical resistivity and its thermal coefficient, and in respect of hardness.

The shock-resistance may be tested in several different ways according to the intended practical use of a material. One method which has been practiced is the following: A circular plate having a thickness of 8 millimeters and a diameter of 30 millimeters is heated in a furnace up to 1300° C. for a period of 5 minutes and is then directly quenched in water of room temperature. The procedure is repeated till the plate will crack. A heat-resistant material according to the present invention containing $MoSi_2$ and 40% by volume of SiC was found to withstand 60 cycles of such treatment before the first crack appeared. For comparison, it may be mentioned that pure $MoSi_2$ cracked after 2 cycles of the test whilst with a SiC content of 25% by volume the plate stood the test 10 times. The shock-resistance is not only dependent on the amount of SiC but also of the grain size distribution.

In a so-called "stiffness tester" a cylindrical rod 50 millimeters in length and 4 millimeters in diameter was tested. A material containing 40% by volume of SiC burst at a bending load of 15 kilograms per sq. millimeter and immediately before its bursting displayed an elastic flexing of 2.7 millimeters at its free extremity. For comparison may be mentioned that pure $MoSi_2$ has a bending strength of the same order, its elastic flexing being, however, unnoticeable, or less than 0.1 millimeter.

A direct consequence of the elasticity of the compositions provided by the present invention will be the one that these materials will not display the brittleness in cold state which is characteristic of silicides and similar materials. A series of practical tests made have shown that the materials of the present invention possess a remarkably high degree of tenacity at all temperatures ranging from room temperature up to the vicinity of the melting point.

A test body 12 millimeters in diameter was subjected to a total pressure of 40 kilogram forces through the medium of a graphite rod which was pressed against the top surface of the test body. The temperature was gently raised and the movement of the rod was observed as a function of the temperatures. At 1715° C. the test body softened and was squeezed under the pressure. The test body contained 40% by volume of silicon carbide in addition to $MoSi_2$. For comparison may be mentioned that pure $MoSi_2$ commences to soften already below 1600° C. Thus it will be seen that silicon carbide will impart an increased heat-resistance to silicides.

Of the two components: the silicide and the silicon carbide, the latter is the more oxidation sensitive one, and, in consequence, it has been found that the heat-resistant material according to the invention has less permanence against oxidation than has pure silicide material. However, the resistance of the composition is better than that of silicon carbide, and it has been found possible, according to the present invention, to produce compositions capable of withstanding even as high temperatures as 1600° C. for extended periods of time. On a certain occasion it was observed that $MoSi_2$ containing 32% by volume of SiC and formed into a rod 5 millimeters in diameter and used as an electrical resistance element in air was able to withstand 500 hours of operation at an ambient temperature of 1600° C. Another rod of the identical composition could withstand 2000 hours at 1550° C. It is of great importance that the composition should contain as small an amount as possible of impurities of the kind known to impair the oxidation resistance of the silicon carbide present. An increase of the iron content, for instance, from 0.03 to 0.70 percent by weight involves a reduction of the useful life of the rods from 500 to 20 hours at 1600° C. The amount of SiC present in the composition will not essentially influence the resistance to oxidations. The latter will not be influenced by the oxides or mixed oxides contained in the compositions, either. On the other hand, the porosity is of great importance. The higher density, the better will be the resistance.

In accordance with what would be expected, compositions of $MoSi_2$ and SiC will possess an electrical conductivity at elevated temperatures which averages those of the pure substances per se. Compositions containing almost pure $MoSi_2$ have a resistivity characteristic which rises fairly uniformly from about 30 microns per centimeter at room temperautre to about 300 at 1600° C. With progressively increased SiC contents the resistance will increase, and at about 40% by volume of SiC a marked maximum will be observed at about 800° C. This maximum will be maintained for increasing SiC contents, and in addition thereto a minimum will be observed at about 1100° C., followed by a continued uniform resistance increase up to the highest temperatures applicable, about 1600° C. At very high SiC contents the resistance characteristic approaches more and more closely that obtained for pure SiC. Apart from the existence of a maximum and a minimum the characteristic curve of a composition containing, for example, 40% by volume SiC will display a total increase in resistance of 350% ranging from room temperature to 1600° C. Pure $MoSi_2$ presents an increase of 900%.

Section 3.—The pressure sintering and cold pressing methods

Heat-resistant materials according to the invention may be produced in accordance with conventional powder-metallurgical practice. The pressure sintering method is well suited for application in the production of compositions of silicides and silicon carbides. Especially at high silicon carbide contents, and if low porosity is aimed at, the pressure sintering method will give superior results. Where the production compositions of SiC and $MoSi_2$ is concerned, a temperature of 1700° C. and a pressure of 100 to 200 kilogram forces per sq. centimeter are suitable operating values. For higher contents of SiC than 60% by volume the operating temperature and pressure will have to be further increased in order to obtain products having low porosity; this, however, involves danger of decomposition of the silicide component. In such cases, therefore, the infiltration method can be used as will be disclosed in Section 7.

At lower SiC contents a high density is attainable by cold pressing and thereafter sintering in an atmosphere of hydrogen or rare gases, or in vacuum. A pressing force of 4 ton-forces per sq. centimeter resulted in a product having a density of 92%. For the production of rods or other elongated objects of uniform cross-section throughout their lengths extrusion pressing methods may be resorted to. A mass of silicide and silicon carbide is mixed with a temporary binder and is extruded from a press having a die of the desired configuration. The binder is expelled at a comparatively low temperature, and the sintering operation is then completed in a protective gaseous atmosphere or under vacuum.

Section 4.—The effect of silica

The $SiO_2$ film present on the silicon carbide particles can have a certain influence on the attainment of a low porosity. Both the silicides and the carbide present will always form such a film the thickness of which may range from a few hundreds of A.U. to a several hundreds of a millimeter. It is well-known in the art that particles covered with surface films of the identical kind are capable of "wetting" each other when used in powder-metallurgical sintering reactions. It is possible, by a controlled and well-defined pre-oxidation or an oxidation brought about during the sintering procedure, to establish a sintering-promoting silicon dioxide layer of suitable thickness on the surfaces of the components to thereby attain low porosity and improved characteristics. To the same end, it may be of advantage if oxides or mixed oxides contained in the composition contain silicon dioxide which will also facilitate the "wetting" property and contribute to the attainment of a low porosity material. The oxide component, in this case, should contain 1% by weight of $SiO_2$, at least, but the same might also consist almost exclusively of $SiO_2$. It would also be convenient in certain cases to admix particularly finely granulated $SiO_2$; it would be possible also to allow $SiO_2$ to form before, or in the course of, the sintering procedure, such as through an oxidation of silicious materials. In some cases it can be of advantage to sinter a preformed body containing SiC and metal silicide at a high temperature in air. This treatment may result in a slight oxidation of SiC and the metal silicide into silica which fills out the remaining pores of the body. In this way completely poreless bodies have been obtained.

Section 5.—The grain sizes

It is essential in order to obtain the optimum in respect of mechanical and other characteristics, that the components of the heat-resistant material according to the invention have suitable grain sizes. It is possible, in the same way as sintered hard metals of the class WC—Co are built up by a skeleton of tungsten carbide kept together by more easily fusible cobalt, to build up compositions according to this invention by a silicon carbide skeleton with a silicide as the binder. The mechanical strength of such a structure is dependent directly on the grain size of the silicon carbide use. In a manner well-known in the art of ceramics, minimum pore space is attainable within the carbide skeleton by intermixing carbide of different grain sizes varying within relatively wide limits. Practical experiments have shown that the use of three specific grain size classes is preferable, viz 60 to 120 mesh, 200 to 280 mesh and dust of about 1000 to 1200 mesh. A minimum of porosity was attained with 50 to 70% by weight of coarse grained, 0 to 20% by weight of medium grained and 10 to 40% by weight of dusty material. The most favourable amounts will depend to some degree on the total amount of SiC, and also on the intended field of application. At an SiC content of 40% by volume, it was found that 60% by weight of the coarse material, 15% by weight of the medium fineness and 25% by weight of the dusty material resulted in superior mechanical strength. Also the grain size of the silicide used will influence the final result. Excessively coarse material will obstruct the formation of low porosity whilst, on the other hand, excessively finely divided material involves the drawback of rendering the silicide too sensible to oxidation during the sintering process. Practical experiments have shown that it is preferable to use a silicide of an average grain size of about 10 microns.

EXAMPLE 1

70 grams of $MoSi_2$ of an average grain size of 19 microns was mixed with 30 grams of silicon carbide having a grain size distribution of: 60% by weight of 60 to 120 mesh, 15% by weight of 240 mesh and 25% by weight of 1200 mesh, and the mixture was pressure sintered in a graphite mould at 1720° C. and 200 kilogram forces per sq. millimeter during 8 minutes. The porosity of the resulting heat-resistant material was 4%. A moulded test plate was found to withstand 85 shock cycles within the range from 1250° C. to room temperature. The effective life of a rod 5 millimeters in diameter in air at 1550° C. was 2200 hours.

EXAMPLE 2

A silicide containing 40% by weight of chromium, the remainder being silicon, was mixed and ground with 45% by weight of silicon carbide and was then compressed and sintered under vacuum at 1580° C. The resulting material was crushed and sieved and was used as the abrasive in ceramic-bound or in synthetic-resin-bound grinding wheels.

Section 6.—Carburization of molybdenum silicide to form $MoSi_2$ and SiC in situ As was disclosed in Section 3 the materials according to the invention may be produced either by pressure sintering in a graphite mould or by cold pressing and subsequent sintering in a non-oxidizing atmosphere. Of these two sintering methods, pressure sintering is technically advantageous as an object of low porosity is obtained but it is economically prohibitive for most purposes. The other method has been found to be suitable where the manufacture of products containing up to approximately 40% by volume of SiC and the balance $MoSi_2$ is concerned, whereas, as regards products having a higher content of SiC difficulties will be encountered in obtaining a sintered object of low porosity and high mechanical strength. The difficulties manifest themselves, inter alia, in that the molybdenum disilicide may disintegrate at the high sintering temperatures which are required to impart sufficient strength to the shaped compacts when rich in SiC. As a matter of fact, when the content of $MoSi_2$ is low, the strength must be based on the bonding force between the silicon carbide particles; however, this bonding force will not be noticeable until the recrystallization temperature being higher than 2200° C. is reached. At this temperature pure $MoSi_2$ melts and may disintegrate in the presence of SiC. On the other hand, if one chooses to perform the sintering at temperatures below the melting point of $MoSi_2$, then the shrinkage of the silicide must be taken into account. Since the silicon carbide contained in the initial material is not capable of sintering, and thus will not shrink, either, this will cause severe internal stresses to arise within the sintered object and to reduce its strength.

The present invention has also for its object to obviate the above-mentioned difficulties and has enabled the production of sintered objects within which the individual silicon carbide particles are bonded both to each other and to the molybdenum disilicide, whereby a bending strength of 14 kg./mm.$^2$ as well as resistance to plastic deformation at temperatures up to 1700° C. have been reached.

A process in manufacturing the shaped body in view will comprise the preparatory step of making, under substantially non-oxidizing conditions, a preliminary body composed of SiC and a metallic component containing molybdenum and silicon. According to the invention the Si content of said component should be present in excess, as calculated according to the formula $MoSi_2$, and said preliminary should be further heat-treated while being carburized until said excess content of silicon is converted substantially completely into silicon carbide, preferably of cubic crystal type. The cubic carbide may be converted into the hexagonal type, if the temperature in the heat-treatment should exceed 1900° C.

The intensive process results in the surprisingly good interbonding of $MoSi_2$ and freshly produced SiC produced when the molybdenum silicide rich in silicon is carburized. To be of substantial importance, the amount of SiC formed should be at least 1% by volume of the body. However, higher amounts give much better results and, to obtain greatly improved strength, the amount of such SiC should preferably be 5 to 20% by volume. A further surprising advantage is that molybdenum silicide having an excess of Si is not decomposed in the presence of CO at high temperature in the harmful way typical for pure $MoSi_2$. Due to these advantageous properties of the novel composition it has been possible even to allow the metallic component to melt in the presence of silicon carbide without being decomposed which, in turn, has rendered possible the manufacture of sintered bodies of an extremely low porosity and other advantageous properties resulting therefrom.

It is possible according to the invention, by varying the proportions between the molybdenum, silicon and silicon carbide contents of the initial material, to produce shaped bodies of various compositions, and consisting preferably of 24 to 80% by weight of SiC and the balance $MoSi_2$, which corresponds to 40 to 90% by volume of SiC and the balance $MoSi_2$.

The material of the preliminary body to be treated according to the invention should have a composition represented in the FIGURE 9 on the accompanying drawing. In this figure a system of triangular coordinates is drawn. The points of the large triangle are designated C, Mo and Si and represent, respectively, 100% C, 0% Mo, 0% Si; and 0% C, 100% Mo, 0% Si, and 0% C, 0% Mo, 100% Si, all percentages being by weight. In this system the small triangular space D, E, F is of particular interest for the composition of the preliminary body. The point D has the coordinates 22% C, 13% Mo, 65% Si, point E the coordinates 3% C, 48% Mo, 49% Si, and point F the coordinates 10% C, 15% Mo and 75% Si, all the percentages being by weight. In this triangular diagram, the whole amount of carbon is assumed to be bound as silicon carbide. For materials to be employed as electrical resistance materials, it has proved to be particularly advantageous to apply for the preliminary body such compositions as to cause the composition of the final body to be 35 to 70% by weight of SiC, and the balance $MoSi_2$. The initial material is first compacted into shape, which is carried out according to any conventional powder metallurgical methods, which will be described more closely in the operating examples. In the compacting operation a binder is suitably employed being of the kind which, when heated in a non-oxidizing atmosphere will give no carbonaceous residue and which will impart to the compact a high curing strength. After compacting, the product is heat treated, preferably in a carbonaceous, reducing atmosphere consisting, for example, of pure carbon monoxide, at a temperature of at least 1300° C., the excess of silicon being then converted into silicon carbide having a very small grain size and being predominantly of a cubic crystal structure. This freshly formed silicon carbide has been found to be capable of forming a strong bond, not only with molybdenum disilicide, but also with the silicon carbide forming part of the original powder mixture which results in a final product of increased mechanical strength.

The time and temperature of the heat treatment are to be adapted to the grain size and composition of the initial material, as well as to the dimensions of the compact. The temperature elevation, in particular up to the melting point of silicon (1420° C.) should preferably be carried out at a slow rate during the initial period of the heat treatment so as to enable the carbon monoxide to penetrate the pores of the compact. If the metallic component is wholly or partially melted during the carburization it must be taken into account that the carbon atoms must be transported by diffusion in the molten component. After the carburizing heat treatment, which should be carried on for 15 to 60 minutes at the maximum temperature, the compact may be sintered in a second step in an oxidizing atmosphere, such as air, at 1300 to 1700° C. This will create a protective skin mainly of quartz glass coating both on the silicon carbide and the molybdenum silicide which will increase the oxidation and corrosion resistance of the final product.

In order to obtain products having good strength characteristics, it is of importance also in this case that the different constituents have suitable grain sizes. The silicon carbide contained in the preliminary compact prior to its carburizing step should preferably be of the hexagonal type and should then be grain graded, i.e. contain grains of varying sizes, for instance, from 200 microns and down to the finest particles having a size of a few microns. This, as is well known, will result in a low porosity of the final product. It is possible also to use grain graded silicon carbide within a larger grain size range, for instance, 2 down to 0.1 millimeters or exclusively carbide having a very small grain size, for instance, 1 to 10 microns. Another factor of importance in respect of the porosity of the final product resides in that the formation of SiC through reaction between solid Si and carbon atoms supplied from the outside is accompanied by a volumetric growth of 8% which corresponds to the shrinkage of the preliminary body taking place upon sintering of the modybdenum silicide powder.

The molybdenum- and silicon-containing metallic component may consist of a pulverulent mixture of molybdenum disilicide and free silicon, and in this case the silicon powder should be finer grained than the silicide powder, and preferably so that 90% by weight, at least, of the silicon will have a grain size of less than 10 microns, while in respect of the molybdenum disilicide 10% by weight, at most, thereof will be finer than 10 microns. It is possible also to use a molybdenum silicon alloy having 47 to 80% by weight of Si, in which case its grain size should be less than approximately 100 microns, and preferably less than 10 microns. The grain sizes specified are values determined microscopically in the preliminary body prior to the carburizing treatment thereof.

In the manufacture of poreless bodies according to the invention it is of particular interest to use the infiltration method. As described more in detail in Section 7 a preliminary porous body of silicon carbide infiltered by a MoSi alloy rich in silicon may be carburized so that the silicon excess is converted into silicon carbide.

In certain instances in a shaped body of silicon carbide and molybdenum disilicide it is desirable to have different compositions in different portions thereof. By way of example, one such case is represented by electrical resistance heating elements where a higher resistivity is desired in the element portion intended to form its incandescent zone, whereas its two terminal-end portions should have a lower electrical resistivity in order to remain cool in operation. This requirement can easily be fulfilled in the manufacturing process according to the present invention by composing the shaped preliminary body of two masses of different resistivities and then carburizing the assembly. In an electrical heating element of uniform cross-sectional area and having its incandescent zone formed by the mass of higher resistivity and the terminal end-portions by the mass of lower resistivity the difference in resistivity between these two masses in their finally treated state should be sufficient to avoid the necessity of providing means for separate cooling of its terminal-end portions. This will be attained if the incandescent zone contains 30 to 45% MoSi$_2$ by weight and the balance SiC, while the terminal-end portions contain 50 to 65% by weight of MoSi$_2$ and the balance SiC.

The way of carrying out the invention in practice is elucidated by the examples cited below.

EXAMPLE 3

A powder mixture is prepared from the following ingredients:

40 parts by weight of hexagonal SiC of a grain size less than 0.1 millimeter,
38 parts by weight of MoSi$_2$, grain size less than 40 microns,
22 parts by weight of silicon, grain size less than 10 microns, and
2 parts by weight of bentonite.

After addition of water, the mixture was extruded into ½″ rods which were dried and pre-sintered for one hour in gaseous hydrogen at temperatures up to 1380° C., the temperature being raised at a slow rate. The preliminary body thus obtained was then heat-treated in pure carbon monoxide at 1700° C., during 15 hours, the weight of the treated compact being thereby increased by 9½ parts by weight. The final product consisted of 38 parts by weight of MoSi$_2$, 71½ parts by weight of SiC and about 2 parts by weight of a binder in the form of molten and solidified bentonite; if the binder is left out of account, the composition will correspond to 34.7% by weight of MoSi$_2$ and 65.3% by weight of SiC. The porosity of the final body was 18% by volume, and its bending strength was 500 kg./cm.$^2$. Its resistance to oxidation corresponds to an increase in weight of 2 milligrams per hour and square centimetre at a temperature of 1500° C. in air.

EXAMPLE 4

An electrical resistance heating element is manufactured in a manner similar in principle to that of Example 3, except therein that the two terminal-end portions of the element are made of a composition different from that of its middle or incandescent zone. Thus, whereas the middle zone is prepared from a powder mixture according to Example 3, the following mixture is used for the end portions:

| | Parts |
|---|---|
| SiC | 27 |
| MoSi$_2$ | 55 |
| Silicon | 18 |
| Bentonite | 2 |

The element is compacted and shaped by ramming in a steel die and in such a way that at first one terminal-end portion, then the incandescent zone, and finally the other terminal-end portion are formed and united into a single integral piece which was heat-treated and carburized as in Example 3.

After the final treatment, and leaving the binder out of account, the terminal-end portions are composed of 50% by weight of MoSi$_2$ and 50% by weight of SiC. Their resistivity is only one fifth of that of the incandescent zone, enabling the element to be employed at high temperatures without any separate cooling of the terminal ends.

EXAMPLE 5

A preliminary body consisting of hexagonal SiC and molybdenum silicide having silicon in excess is first prepared by infiltration of the melted alloy into a skeleton of SiC pre-recrystallized at about 2400° C. The compact is composed of 18 parts by weight of SiC and 14 parts by weight of molybdenum silicide containing 50% by weight of Mo and 50% by weight of Si.

The compact is thereafter carburized, in a first step in pure CO at 1800° C. for 20 minutes causing the excess of silicon to be partially converted into SiC. After the carburization the body is subjected to a heating for a few hours in air at 1500° C. and immediately thereafter it is cooled down quickly. This treatment is followed by a second carburization step for 20 minutes at 1800° C. the remaining silicon excess being than converted into SiC. Through heating in air at 1500° C. for one or two hours the body will be provided with a protecting quartz glass coating. It can then be ascertained that repeated quick cooling down procedures will have no detrimental influence on the properties of the final body.

For the final product, the following characteristics are stated:

Composition: 67.5% by weight SiC and 32.5% by weight MoSi$_2$
Porosity: 3% by volume Density: 3.8 g./cm.³
Bending strength: 14 kg./mm.²
Resistivity:
  At 20° C.: 5 ohm mm.²/m.
  At 1500° C.: 15 ohm mm.²/m.
Oxidation resistance in air at 1500° C.: Weight increase= 0.03 milligrams/hour and cm.².

EXAMPLE 6

An electrical resistance heating element intended for operation up to 1600° C. is manufactured by heat-treating an infiltrated SiC-rod in the same way, in principle, as according to Example 5. In order to obtain cool terminal-end portions in accordance with Example 4, the compact is rammed in one single piece with three sections, then imparting to the silicon carbide skeleton in the terminal-end portions a higher degree of porosity in order to cause the same during the subsequent infiltration step to absorb a larger quantity of alloy than the incandescent-zone portion. This higher degree of porosity of the terminal-end portions is attained, in a manner known per se, by using silicon carbide of one single order of grain size only, such as of the grain size range from 0.04 to 0.08 millimeters. The three-part silicon carbide rod thus formed and subsequently recrystallized was found to have 45% by volume porosity in its terminal-end portions and 20% porosity in its incandescent-zone portion. The pores, in the infiltration step, are filled with the same alloy as in Example 3, and the shaped compact, which will contain 61.8% of the alloy in its end portions and 43.7% thereof in its incandescent zone, is then ready for the final heat-treatment step according to the invention. The resistivity of the terminal-end portions of the final product will be approximately only one quarter of that of the incandescent zone owing to their higher content of MoSi₂.

indicate the coordinates for the contents of Si, C and Mo for each example after carburization.

*Section 7.—The infiltration method of making materials.*

The present invention, in one aspect, relates to a process of producing silicide bodies consisting of a silicon carbide skeleton with a pore-filling metallic binder component and characterized by having very low porosity.

As has been set forth in the preceding sections non-porous bodies of silicon carbide and a metal silicide can be produced powder-metallurgically by the pressure sintering method or the cold pressing method. In the former case, bodies with up to about 60% SiC can be made while the latter method works satisfactory only at lower SiC contents. A manufacture of bodies with more than 60% SiC could not be effected without serious difficulties.

The new method has for its object to avoid the difficulties and enables the production of oxidation and heat-resistant bodies with an overall porosity not exceeding 15% by volume and containing up to 90% by volume of silicon carbide, as calculated on the solid substance, together with a metallic silicide (A).

In one aspect, my invention comprises the steps of shaping a preliminary porous body consisting essentially of one or more members of a group consisting of hexagonal SiC, cubic SiC, graphite, amorphous carbon, and carbon containing carbonizable material, bringing a powdered alloy containing a percentage by weight of silicon exceeding the percentage of weight of silicon in said refractory alloy, to surround said preliminary body in intimate contact therewith, heating said preliminary body and said surrounding powder in a carbonizing atmosphere at a temperature above the melting temperature of said powder but below the decomposition temperature of SiC and for a time sufficient to infiltrate substantially all the pores in at least one coherent portion of said preliminary body with a part of said molten powder, letting the balance of said powder form outside the infiltrated body a loosely adhering porous cake consisting of SiC particles produced in situ and embedded in a sintered residue of carbonized alloy powder, and finally removing from the surface of the infiltrated dense body said loosely adhering porous cake.

The alloys and binders (A, B and C) treated according to the present invention may be of many kinds. To cause the finished product to exhibit good oxidation-resistance at high temperature, i.e. above 1200° C., preferably above 1400° C., the metallic binder (A), too, must exhibit good oxidation-resistance at such temperatures, which involves a limitation to the use of heat-resistant silicides, borides, aluminides and titanides of certain high-melting metals

TABLE I.—CARBURIZATION

| | Example 3 | | Example 4 (terminal ends) | | Example 5 | | Example 6 (terminal ends) | |
|---|---|---|---|---|---|---|---|---|
| | Before | After | Before | After | Before | After | Before | After |
| Percent SiC, 40 | | 65.3 | 27 | 50.0 | 56.3 | 67.5 | 38.2 | 54.2 |
| Percent MoSi₂, 38 | | 34.7 | 55 | 50.0 | | 32.5 | | 45.8 |
| Percent St, 22 | | | 18 | | | | | |
| Percent MoSi-alloy with 50% Mo, Si 50% | | | | | 43.7 | | 61.8 | |

The percentage values regarding SiC, MoSi₂ and Si (Table I) may be converted into percents by weight of C, Mo and Si (Table II) in order to facilitate their inclusion into the triangular coordinate system.

The numeral values are as follows:

TABLE II.—CARBURIZATION

| | Example 3 | | Example 4 (terminal ends) | | Example 5 | | Example 6 (terminal ends) | |
|---|---|---|---|---|---|---|---|---|
| | Before | After | Before | After | Before | After | Before | After |
| Percent C, 12.0 | | 19.6 | 8.1 | 15.0 | 16.9 | 20.2 | 11.7 | 16.5 |
| Percent Mo, 23.9 | | 21.8 | 34.6 | 31.5 | 21.9 | 21.0 | 30.5 | 28.9 |
| Percent Si, 64.1 | | 58.6 | 57.3 | 53.5 | 61.2 | 58.8 | 57.8 | 54.6 |

In FIGURE 9 the numerals 1, 2, 3 and 4 represent the coordinates for the composition of the preliminary bodies according to the four examples. The arrows indicate the change in composition caused by the carburization. A straight line connects the point SiC on the line Si-C corresponding to pure SiC with the point MoSi₂ on the line Si-Mo, corresponding to pure MoSi₂. The different points on the straight line SiC-MoSi₂ indicate the contents of C, Mo and Si for different proportions of SiC and MoSi₂ there being no excess or lack of Si in relation to said formulae. The positions of the points of the arrows thus and metalloids. In the first place, the invention embraces the production of silicon carbide bodies or articles with a metallic silicide binder, preferably $MoSi_2$. The addition of boron to heat-resistant silicides is interesting from several points of view, for example thereby that borides are often characterized by very high melting points. One interesting combination is that of silicon with boron, solely, and the invention, accordingly, includes also articles of silicon carbide with a binder (A) of silicon boride.

Section 8.—The skeleton body used for infiltration purpose

The silicon carbide used for producing articles or bodies according to the invention may be obtained in several different ways. Thus it is possible to use so-called α-silicon-carbide which may consist of crystal grains of sizes ranging from a few microns up to several millimeters. It is possible also to start from a very finely grained product called β-silicon-carbide and distringuishing from the α-type by having a cubic crystal structure. It is suitable, as a rule, that the grain sizes of the silicon carbide used varies within wide limits whereby a lower porosity of the finished article will be attained. It is known in the field of ceramics that a mixture of different grain fractions of silicon carbide results in a minimized porosity, but the exact quantitative relationship varies as a function of the desired grain-size interval as well as of the binder used, and, therefore, cannot be stated in general terms. For example, for powder mixtures consisting of exclusively silicon carbide without any binder, the U.S. patent specification No. 2,015,778 states laws to be followed in order to attain a minimum prorsity. In this instance a mixture of 38% coarse, 20% medium and 42% fine fractions is used in which the largest grains in each fraction have a diameter 2 to 3 times larger than those of the next-finer fraction, and in this case a density of 2.5 g./cm.$^3$ is obtained corresponding to an overall porosity of 19%.

According to the invention, it has been found to be suitable to follow this law, in principle at least, and at the same time to replace a portion of the fine fraction by the binder (B), whereas the coarse and medium fractions consist exclusively of silicon carbide. If β-SiC is used in combination with α-SiC, it is preferably included in total in the 42% constituted by the fine fraction. If the specific gravities of the additions differ from that of SiC, it is to be taken into consideration that the proportions 38–20–42 are in terms of percents by volume, thus necessitating conversion from parts by volume into parts by weight.

Thus, if a shaped article is to be produced from, for example, 31% by weight of a metallic binder (B) having a specific gravity of 8.0, and 69% by weight of SiC (sp.g.=3.1), the following powder mixture is used in order to obtain the minimum porosity:

31% by weight of metal powder (<10 microns)=15% by volume plus 22% by weight of SiC, fine (<10 microns)=27% by volume=42% by volume.
16% by weight of SiC, medium (<25 microns)=20% by volume.
31% by weight of SiC, coarse (<70 microns)=38% by volume.

(The percents by volume are the theoretical values for a non-porous body.)

It is also possible according to the invention to form the silicon carbide at least partly in situ in the bodies, for instance, by subjecting a carbon skeleton to silicidizing gases or to the action of fused silicon, or by treating a silicon skeleton with carbonaceous gases. It is possible also to start from a mixture of carbon and silicon which mixture is compacted and then sintered while forming silicon carbide. The skeleton body can thus be constituted by carbon only in any form, or by a mixture of carbon and silicon carbide. It is further possible to combine this SiC-forming process with the infiltration process so that only one heat-treatment is necessary.

The substances used as the binder (B) in the production of the porous preliminary bodies of silicon carbide may also be of different kinds and may be incorporated in various ways. One way is to start from a powder mixture of, on one hand, silicon carbide or materials capable of being converted into silicon carbide, and, on the other hand, a metal or an alloy, and then to sinter the mixture into the desired porosity. Instead of a metal, it is possible to start from compounds adapted upon being subjected to high temperature or to suitable gases to be converted into a metal, for instance an oxide or oxide mixture which is reduced into a metal in gaseous hydrogen at high temperature.

The binders (B), alternatively, may be difficultly reducible oxides capable of reacting with metals at high temperature. That is the case with $SiO_2$ which is capable of reacting at 1800° C. with Si while forming SiO which volatilizes. Therefore, the invention includes also any application in which the silicon carbide has been bonded (B) with $SiO_2$ and is infiltrated with a silicon alloy (C).

However, there is no necessity of using any binder at all in the production of the porous preliminary body, in which case the latter may consist exclusively of SiC in the form of a recrystallized skeleton.

The porous preliminary body to be infiltrated in accordance with the invention must be sufficiently heat-resistant to be capable of being heated to the infiltration temperature without suffering any damage. For example, when using pure silicon this temperature is about 1800° C., at least, in spite of the fact that silicon melts already at 1420° C. Without being confined by my theory, it may be assumed that such required over-temperature of nearly 400° C. would be tied up with the probable fact that infiltration will only take place if the thin film of silicon dioxide which readily forms on fused silicon is removed. This, as mentioned hereinbefore, will occur when silicon reacts with silicon dioxide into silicon monoxide, which volatilizes at 1800° C.

The production of the porous preliminary shaped body essential to the invention may be performed in many different ways which are each known per se, and therefore detailed directions as regards the production of the preliminary body will be given merely for a few different compositions as stated in the examples of execution hereinafter. The composition and porosity of the preliminary body may vary within wide limits, but as a general statement the pore volume will have to constitute 15 to 60% of the volume of the preliminary body, and in this case the open pores should have a maximum diameter of 50 microns. Such a limitation of the pore size is realized by the mixture mass preferably containing fine-grained fractions of both silicon carbide and binder, such as up to 0.1 mm. grain size, it being of importance, in addition, that the mechanical intermixing of the components is intimate. Separate pore spaces in excess of 50 microns may make the final material defective, since this would make difficult a complete reaction of the infiltrated alloy (C) with the binder (B) included in the preliminary shaped body, and there will be a risk that the finished article would contain non-desirable substances insufficiently resistant to oxidation.

As regards closed and open pores as stated in this connection, it should be mentioned that the all-penetrating or open porosity is determined by measuring the water absorption by conventional techniques as practiced in the art of ceramics. The overall percentage porosity (p) is calculated from the observed density (d) and the theoretical density (D) which the preliminary body would have according to the mixing rule if it were non-porous, according to the following formula:

$$p = 100\left(1 - \frac{d}{D}\right)$$

The difference between the overall porosity and the open porosity is termed here the closed porosity. Since the determination of D requires knowledge of the composition, and the latter cannot always be accurately determined, it will be necessary sometimes to determine various kinds of porosity by resorting to microscopical techniques.

The binder (B) content of the preliminary body may be as low as 1 percent by volume, but is preferably not lower than 5%, and should not exceed 40 percent by volume, as calculated on the solid substance. If the binder (B) contains $SiO_2$ it should be noted that the reaction with the infiltrated alloy (C) will be accompanied by formation of gas during the short duration of the infiltration process, and therefore difficulties may be encountered at excessive contents of reacting $SiO_2$. Preferably, the $SiO_2$-content of the porous preliminary body should range between 2 and 10 percent by volume.

*Section 9.—Packing the skeleton body in silicide powder*

When infiltrating with silicon-containing alloys, it has been found according to the invention that, quite surprisingly, the infiltration process will be enhanced if the powder of the alloy is very fine-grained. When a powder having grain sizes coarser than 60 mesh was used, difficulties were encountered in separating the infiltrated body from the excess of adherent fused alloy, and the surface was rough. Better results were obtained with grain sizes less than 100 microns, and powders finer than 10 microns yielded compacts having a smooth surface without any adherent fused matter. For performing the infiltration, the preliminary bodies may be packed into alloy-powder in bulk form or in the form of porous masses having a porosity of at least 30% by volume. Preferably the porosity should be within the limits of 40 to 60% by volume.

The packing of the preliminary bodies of silicon carbide into the powdered alloy can be executed in several different ways. If the handling strength of the compacted silicon carbide body should be insufficient to allow the body to have a layer of the powdered alloy applied thereto by mechanical techniques, then it is possible instead, for example where the production of straight rods of uniform thickness is concerned, to place the straight, cold-formed rod centrally within a tube of paper, after which the space between the paper and rod is filled with the powdered alloy. However, as a rule, it would be possible to impart to the formed silicon carbide body sufficient strength to enable the same to be coated with metallic powder, for instance by any suitable method known per se as used in the production of coated welding electrodes. In this case it is suitable to use a temporary binder of organic or inorganic nature, for example waterglass, bentonite, paraffin, plastic, or the like.

The above method of enclosing the alloy-powder coated rod of compacted silicon carbide in a casing of paper offers unexpected advantages in production on an industrial scale. As a matter of fact it has been found that the rods with their paper casings can be piled in contact with each other without this affecting the infiltration process. This seems to depend on the fact that, during and after its combustion, the paper will form a thin-walled tube of silicon carbide which is capable of effectively screening off the powdered alloy causing the latter to be completely absorbed by one single silicon carbide rod without adhering, neither to the surface of this rod, nor to any of the other rods. The rods are preferably disposed horizontally with their paper casings parallel and close to each other so that the cylindrical casings engage each other along straight lines. It is thus possible, for example, to dispose seven rods in a manner to cause their centres to define, in a plane at right angles to the rod axes, the corners of a regular hexagon, the seventh rod defining the centre of the hexagon. For performing the infiltration, the seven-rod pack can readily be placed in a carbon or graphite tube, and by this arrangement the furnace equipment, of course, will be utilized more favourably than in the case of heat-treating the rods individually, which is of great economical importance. In addition, it has been found by practical tests that the simultaneous annealing of several rods results in an improved quality of the final product, which could be caused by the fact that random variations in the furnace temperature and furnace atmosphere will be more readily equalized where the furnace is filled with rods.

The above-described method according to the invention is suitable for use in the production of straight rods. Other shapes, for instance hairpin-shaped resistance elements, may be obtained by combining straight rods with curved rod-elements made of different materials, such as $MoSi_2$. This may be performed by upset or butt welding, and by this means elements of any desired shape may be manufactured.

Even though the coating with paper is particularly suitable for use in the process according to the presently described development of the invention, it may, of course, be applied also in cases where the silicon carbide rod has been recrystallized in a separate sintering operation. If it has only been compacted or dried, the surrounding paper casing will yet impart to the rod the handling strength desirable for the infiltration step.

Instead of paper, other organic materials may be used which are capable of being burnt incompletely into carbon, as is the case with paper. Thus it is possible to use thin casings of plastic material, for example. The application of the casing may be carried out also by spraying or dipping techniques. It is also possible to coat a paper or plastic sheet with the layer of powdered alloy required for the infiltration prior to its application around the silicon carbide rod. Finally, in large-scale production it is possible to produce the coated rod in one single operation by extruding silicon carbide, powdered alloy and casing through a forming die.

After the infiltration step, it may be desirable to perform a further heat-treatment in order to stabilize the reaction product (A) formed, or to attain a reaction as complete as possible between the binder (B) and the infiltrating alloy (C). The infiltration process proper takes place at a rapid rate, say in a few seconds, but due to the heat capacity of the object to be infiltrated and possibly that of any furnace or crucible equipment employed, the period required for heating up to high temperature will, as a rule, be sufficiently long to make any subsequent heat-treatment unnecessary in certain cases. In other cases, however, it is desirable in order to cause oxidation of the metallic product (A) formed, to subject the bodies to heat-treatment in air at a temperature which may be lower than the infiltration temperature. This may give rise to the formation of a vitreous coating of quartz glass, for example, which will fill out any remaining pores and will act as a protective outer skin which will improve the resistance to corrosion still further.

The method of carrying the invention into effect will be elucidated in the following examples of execution:

EXAMPLE 7

A powder mixture of 60 parts of silicon carbide, 1 part of bentonite, 36 parts of molybdenum and 4 parts of silicon by weight was admixed with a suitable quantity of water and was extruded into ½″ rods. The bentonite was used to obtain sufficient handling strength for the sintering process. The silicon carbide was of the green hexagonal type with a particle size of 0.15 mm. and finer, whereas the molybdenum powder as well as the silicon powder were both of a grain size less than 10 microns. The rods were dried and subjected to sintering in hydrogen gas for 15 minutes at 1500° C. whereby an ultimate bending strength of 120 kg./mm.$^2$ was obtained. Since molybdenum and silicon were present in the atomic ratio of 2.7:1, they may be assumed to form predominantely the compound $Mo_3Si$ in the porous preliminary body. The porosity of the preliminary bodies was now 40%, and they were treated with molten silicon (C) at 1850° C. by charging the rods together with coarse silicon powder into an elongated, covered graphite crucible which was subjected to induction heating. By determining the increase in weight it was established that the sintered body had absorbed a quantity of silicon corresponding to 30 of the 40% of pores by volume really existing. Finally, the infiltrated body was annealed during 100 hours in air at 1550° C. It was established by examination under the microscope that, after the oxidizing annealing step, the body was composed of two phases, namely hexagonal silicon carbide and molybdenum disilicide (A). As a remarkable fact, not the slightest trace of oxidation products could be observed in the interior of the bodies after the oxidizing annealing step. The wetting between the particles of SiC and $MoSi_2$ is perfect and the boundaries between the phases were line-sharp, at least at a linear magnification of 400 times. On the basis of the composition of the body and its weight per unit volume its density was calculated to be 90% of the theoretical value, which corresponds to an overall porosity of 10% by volume. In the oxidizing annealing step the body was coated with a superficial adherent skin consisting predominantely of silicon dioxide in the form of a gas-tight glass which increases the resistance of the material to oxidation at high temperature.

EXAMPLE 8

A mixture of 30% by weight α-SiC finer than 0.1 mm., and 70% by weight molybdenum silicide was preliminary shaped and was pre-sintered in hydrogen gas at 1100° C. The silicide contained 55% Mo and 45% Si and its particle sizes ranged between 3 and 8 microns. The preliminary body was then sintered in the same furnace, first in dry hydrogen gas up to 1650° C. and immediately thereafter in carbon monoxide during 30 minutes at 1700° C. A portion of the molybdenum silicide reacts with the carbon monoxide while forming β-type silicon carbide in situ together with a molybdenum silicide of the composition $Mo_5Si_3$. At temperatures below 1650° C. the silicide must not come into contact with carbon monoxide because this would cause formation of secondary products with poor resistance to oxidation. The infiltration with silicon was carried out as in Example 7. The advantage of this method resides in that the β-type silicon carbide formed in situ is capable of establishing an integral mechanical bond between the grains of α-type silicon carbide. This will result in a body having a continuous three-dimensional skeleton of silicon carbide which imparts the product a high mechanical strength even at high temperature.

EXAMPLE 9

In a porous preliminary shaped body of recrystallized silicon carbide the density is 2.06 g./cm.$^3$ corresponding to a total porosity of 36% by volume. Impregnation is carried out with an alloy (C) containing 55% Si and 45% boron. The weight of the alloy (C) thus absorbed is 28% of the weight of the porous body and the metallic binder (A) will be found to have the composition $SiB_3$. Oxidation tests in pure oxygen at 1400° C. showed a total increase in weight of only 0.054% during 15 hours.

EXAMPLE 10

Hexagonal silicon carbide is mixed according to Example 7 with equal amounts of ferrotitanium (30% Ti) having a particle size of 10 microns, and is rapidly sintered at 1300° C. in hydrogen gas, after which infiltration may be performed with an alloy containing 55% Si and 45% Ti. If the increase in weight of the preliminary body is found to be 95%, then after the infiltration step the metallic binder (A) will be of the following composition: 25% iron, 40% titanium and 35% silicon.

EXAMPLE 11

The production process according to Example 10 may be performed in a manner to incorporate in the finished product a metallic binder (A) of the composition $(Ti,Cr)B_2+20\%$ by weight of Si after infiltration with pure silicon into a preliminary shaped body of SiC with $(Ti,Cr)B_2$ as the binder.

EXAMPLE 12

The process according to Example 7 is performed with a porous preliminary body which, in addition to silicon carbide, contains as the binder (B) molybdenum silocoaluminide of the composition 83% Mo, 14% Si and 3% Al. After infiltration with an alloy (C) of 50% Si and 50% Al, the final product will contain a binder (A) of the composition 65% molybdenum, 23% silicon and 12% aluminium.

EXAMPLE 13

Black SiC of a grain size less than 0.5 mm. is mixed with 20% by weight of sponge titanium having a maximum particle size of 20 microns. Preliminary shaped bodies are prepared by sintering the mixture in hydrogen gas at 1650° C. and are infiltrated with a silicon-boron alloy of the composition $SiB_3$ at 1900° C. If the amount of silicon triboride absorbed is ⅔ of the weight of the sponge titanium, the metallic binder (A) in the final product will be of the composition $Ti_2SiB_3$.

EXAMPLES 14 TO 17

Four tubes of recrystallized SiC were embedded in powdered molybdenum silicides (finer than 10 microns) with varying silicon contents and were heated in a closed graphite crucible during 15 minutes at 2100° C. The dimensions of the tubes were: outer diameter 12.3 mm., inner diameter 4.0 mm., length 50 mm. and showed no change after the infiltration step. The result of the experiments have been summarized in the following table:

|  | Example No. | | | |
| --- | --- | --- | --- | --- |
|  | 14 | 15 | 16 | 17 |
| Si-content of the silicide in the powder, percent | 58 | 50 | 40 | 37 |
| Si-content of the silicide after infiltration, percent | 50 | 43 | 33 | 32 |
| Weight of tube before infiltration, g | 11.0 | 11.0 | 11.0 | 11.0 |
| Weight of tube after infiltration, g | 18.7 | 19.8 | 19.7 | 20.1 |
| Resistivity in ohm-mm.$^2$/m. before infiltration | 1,700 | 1,700 | 1,700 | 1,700 |
| Resistivity after infiltration (20° C.) | 4.5 | 5.5 | 67 | 870 |
| Resistivity before infiltration (1,500° C.) | 15 | 17 | 30 | 200 |

It is remarkable that the coefficient of electrical resistivity is positive in Examples 14 and 15, which offers interesting possibilities of utilizing the materials as electrical resistance elements for heating purposes in an oxidizing atmosphere. Since in all of the samples the porosity has been reduced from about 30% to less than 5% by volume, the resistance to corrosion should be considerable, particularly if the composition of the silicide after the infiltration step be so chosen as to correspond to the formula $MoSi_2$ or to have a slight deficiency of silicon, corresponding, for example, to 34 to 36% Si.

*Section 10.—Effect of pores in the preliminary body*

Continued investigations carried out by the applicant have shown that the size of the pore voids within the preliminary shaped body to be filled out by the silicious alloy may exert a critical influence on the characteristics of the finally produced bodies. If a preliminary body having an average pore diameter in excess of about 10 microns, being for example 100 microns, is infiltrated with a molybdenum-silicon alloy and is heat-treated in a manner to cause the finished body to consist of silicon carbide having $MoSi_2$ in its pores, then, upon subjecting the body to rapid cooling, this $MoSi_2$ will burst into a number of smaller crystal grains each of an average particle diameter of about 10 microns. On re-heating the body to a temperature sufficient to recrystallize the $MoSi_2$, i.e., above about 1000° C., the small crystal fragments will grow together again into larger particles which will burst again on cooling. These phenomena will affect several characteristics of the final products, for instance their electrical resistivity and mechanical strength. The influence on the resistivity is particularly obvious and will manifest itself in a great increase in resistivity as the body is cooled down. Such increase in resistivity may sometimes amount to several hundreds of percents and may also be accompanied by a delay, which manifests itself, inter alia, in that the resistivity continues to increase during several days after cooling down to room temperature. Bodies presenting such characteristics are obviously unsuitable as electrical resistance materials, for example. The unfavourable effect associated with cooling probably has connection with the differing coefficients of thermal expansion of SiC and the metallic component. A reduction of grain and pore sizes would not be a favourable solution, since the infiltration of the fine pores would be made more difficult due to the fact that they are largely closed. Thus the overall porosity of the bodies would be higher than that resulting when infiltrating coarser pores. According to a further development of the present invention provision is made for advantageously preventing the unfavourable effect just described.

According to a further embodiment of the invention, the difficulties referred to are overcome in that the pore-filling metallic component consists of at least two different phases having an average particle size finer than 20 microns, the particle size being preferably approximately 10 microns. This will prevent the bursting of the metallic phase on cooling characteristic of bodies containing metallic particles of one phase only. The presence of at least two different phases involves the effect of inhibiting further substantial grain growth at high temperatures, which will also contribute to prevent bursting upon cooling down.

The phase composition of the metallic component may be influenced in different ways. One way is to select the composition of the infiltrating alloy in a manner to render the desired phases in the final product. Another way is to subject the infiltrated body to heat-treatment in an atmosphere of controlled composition in a manner to cause new phases to form in the metallic component. Thus, for example, if the atmosphere is carburizing, then any excess of silicon which may form in the grain boundaries betwen the broken silicide grains or within the silicide mass, will be converted in situ into SiC. Annealing in air may convert an excess of silicon into $SiO_2$ which may also be applied to put a check on the grain growth.

Of particular interest are bodies in which the metallic component consists wholly or in part of $MoSi_2$. According to the invention a metallic component which is less liable to bursting and subsequent grain growth is provided by the addition to the infiltrating alloy of one or several of the following elements: W, Cr, Ta, Nb, V, Ti, Zr, Hf, B, Mn, Fe, Co and Ni. Then the metallic component will consist of at least two phases one of these preferably being the ordinary tetragonal $MoSi_2$ and the other or others being mixed silicides. For example, if the addition is Cr, then the metallic component will consist of two phases, namely (1) tetragonal $MoSi_2$ and (2) a hexagonal mixed silicide of the formula $(Mo, Cr)Si_2$. In this case $MoSi_2$ might dissolve a small amount of $CrSi_2$ but will still keep its characteristic tetragonal $MoSi_2$-structure. It is suitable that the inclusion of Cr or of other similar additions be performed in small amounts, say between 1 and 15%, preferably about 5%, by weight.

If the infiltration, or any subsequent heat-treatment, is carried out in a carburizing atmosphere, hten, as stated hereinbefore, a portion of the excess of silicon will be converted into SiC in situ. Such silicon carbide crystals will have a size of 1 to 10 microns and are built up in the interior of the metallic component. They influence the quality of the final product in an extraordinarily advantageous way. The carburation is suitably performed in CO during 10 to 60 minutes at 1700 to 1900° C.

Section 11.—Incomplete pore-filling

As in the basic embodiment described hereinbefore, the infiltration is suitably carried out by embedding the porous preliminary body in a powdered alloy and subsequent heating to cause fusion of the powder. The pores will thus be filled with molten stock as long as an excess thereof exists. This enables local infiltrations to be effected in regions where this is desirable. This may be an advantageous method of establishing in electrical resistance elements different resistivity values in different portions of the element without the necessity of changing the cross-sectional area of the porous preliminary body. It is also possible by controlling the amount of infiltrating material in relation to the porosity of the preliminary body to adjust occasional porosity variations to obtain a final product with a constant and reproducible content of the metallic component.

An incomplete infiltration will have different results depending on the composition and temperature of the alloys. In certain cases there will be a uniform distribution of alloy and remaining pores. In other cases a superficial layer of the preliminary porous body will be entirely infiltrated to a certain depth whereas there will not be any absorption of alloy to any noticeable degree at deeper levels. The present invention must thus not be considered as restricted to materials being infiltrated in their entirety. If only a thin superficial layer is completely infiltrated valuable technical properties may be obtained and, at the same time, a considerable saving of alloy. To cause the superficial layer to function as an efficient bar against corrosion attacks of gases or liquids it is preferable to make the thickness of the layer so as to be at least twice the diameter of the largest silicon carbide particles included in the body. The thickness of the layer should in any case be at least 100 microns, preferably at least 0.5 mm. In other cases the thickness may be considerably greater, for instance, in bricks, crucibles, capsules, muffles et cetera in which infiltrated layers having thicknesses of 2 to 5 mms. may be found advantageous. In FIG. 8 there is shown the quantities of alloy absorbed as a function of the quantity of available alloy powder. The percentages are referred to the weight of the porous preliminary body. In FIG. 7 the specific resistance is plotted at different temperatures for rods A to F infiltrated with varying quantities of alloy. Said rods were all manufactured of SiC and the grain size was 325 mesh. The rod G corresponds to the rod F but was manufactured from a mixture of 80% SiC, 325 mesh and 20% SiC, 800 mesh.

EXAMPLES 18 TO 29

The following table gives an account of 12 tests which illustrate various ways of carrying the invention into effect. Each test was performed as follows: Rods of recrystallized silicon carbide with about 30% porosity were placed in a graphite crucible, a layer of silicide powder separating the rod from the crucible. The rod diameter was 12.5 mms. and the rod had a 4.0 mms. central hole. The powder layer was 3.0 mms. thick. The graphite crucible was rapidly heated to 2000° C. and was maintained at that temperature for 15 minutes. After cooling down the following characteristics of the infiltrated rods were determined: specific gravity, resistivity at 20° C. and weight increase and change in resistivity after oxidation at 1500° C. The silicide powder was composed of 4 parts of $MoSi_2$, grain size 10 microns, and 1 part silicon powder, grain size below 43 microns, and further an extra addition of 5% by weight of an element from the group: Cr, V, Co, Ta, Zr, W, B, Ni, Fe, Al and Mn. Test No. 29 was a zero- or reference test without said extra addition:

| a. Example No. | 18 | 19 | 20 | 21 | 22 | 27 |
|---|---|---|---|---|---|---|
| b. Powdered extra addition | Cr | V | Co | Ta | Zr | W |
| c. Weight before infiltration | 13.41 | 12.32 | 12.24 | 12.7 | 14.5 | 12.36 |
| d. Weight after infiltration | 20.91 | 23.76 | 23.84 | 22.9 | 24.5 | 22.11 |
| e. Volume, cm.³ | 5.9 | 6.1 | 6.2 | 5.9 | 6.4 | 5.9 |
| f. Spec. gravity before (d1) | 2.27 | 2.02 | 1.97 | 2.15 | 2.26 | 2.10 |
| g. Spec. gravity after (d2) | 3.54 | 3.88 | 3.84 | 3.88 | 3.82 | 3.75 |
| h. d2−d1 | 1.27 | 1.86 | 1.87 | 1.73 | 1.56 | 1.65 |
| i. Oxidation, percent weight increase/h | .006 | .014 | .020 | .022 | .010 | .022 |
| j. Resistivity before oxidation | 53 | 169 | 53 | 145 | 43 | 72 |
| k. After ox. for 20 h. at 20° C., ohms.mm.²/m | 32 | 108 | 38 | 110 | 24 | 72 |
| l. After ox. for 40 h. at 20° C., ohms.mm.²/m | 30 | 116 | 53 | 93 | 33 | 82 |
| m. After ox. for 60 h. at 20° C., ohms.mm.²/m | 32 | 117 | 52 | 92 | 36 | 82 |
| n. After ox. for 30 days, 20° C., ohms.mm.²/m | 30 | 117 | 63 | 88 | 38 | 83 |
| p. Porosity before infiltration (p.) | 29 | 37 | 38½ | 33 | 29 | 34½ |
| q. (d2−d1)/p | 4.4 | 5.0 | 4.9 | 5.3 | 5.4 | 4.8 |
| r. Water absorption after infiltration | 1.5 | 1.8 | 1.5 | 0.8 | 2.1 | 4.2 |

| a. Example No. | 24 | 25 | 26 | 27 | 28 | 29 |
|---|---|---|---|---|---|---|
| b. Powdered extra addition | B | Ni | Fe | Al | Nn | |
| c. Weight before infiltration | 12.07 | 12.01 | 11.48 | 11.65 | 13.87 | 11.0 |
| d. Weight after infiltration | 22.49 | 23.84 | 20.83 | 22.48 | 22.35 | 19.8 |
| e. Volume, cm.³ | 6.0 | 6.2 | 5.5 | 5.4 | 5.9 | 5.3 |
| f. Spec. gravity before (d1) | 2.01 | 1.94 | 2.08 | 2.16 | 2.35 | 2.07 |
| g. Spec. gravity after (d2) | 3.74 | 3.84 | 3.78 | 4.16 | 3.78 | 3.72 |
| h. d2−d1 | 1.73 | 1.90 | 1.70 | 2.00 | 1.43 | 1.65 |
| i. Oxidation, percent weight increase/h | .001 | .037 | .048 | .017 | .011 | .010 |
| j. Resistivity before oxidation | 19 | 19 | 103 | 29 | 29 | 5.5 |
| k. After ox. for 20 h at 20° C., ohms. mm.²/m | 34 | 14 | 99 | 330 | 29 | 82 |
| l. After ox. for 40 h at 20° C., ohms. mm.²/m | 49 | 16 | 146 | 305 | 33 | 108 |
| m. After ox. for 60 h at 20° C., ohms. mm.²/m | 56 | 14 | 146 | 348 | 38 | 85 |
| n. After ox. for 30 days, 20° C., ohms.mm.²/m | 69 | 16 | 145 | 339 | 41 | 260 |
| p. Porosity before infiltration (p.) | 37 | 39½ | 35 | 32½ | 26½ | 35 |
| q. (d2−d1)/p | 4.7 | 4.8 | 4.9 | 6.1 | 5.4 | 4.7 |
| r. Water absorption after infiltration | 1.7 | 2.5 | (¹) | (¹) | (¹) | 4.0 |

¹ Unstated.

Lline "i" of the table states the weight increase per hour after annealing during 40 hours in air at 1500° C. Lines "k" to "m" denote the resistivity in ohm·mm.²/m. after annealing during, respectively, 20, 40 and 60 hours. Line "n" tabulates the resistivity after annealing during 60 hours and subsequent storage during 3 days at room temperature.

Line "q" enlists the values of $(d2-d1)/p$, i.e. the ratio of alloy absorbed to the porosity of the preliminary shaped body. When the pores are completely filled out, this ratio will be a measure of the specific gravity of the alloy. This value in the 12 tests varies between the limits 4.4 and 6.1, which is in good approximation to the specific gravities of the basic alloy, 4.7 g./cm.³, and of $MoSi_2$, 6.2 g./cm.³. As stated in connection with the first-described embodiment, the silicon content of the alloy will decrease from 50%, in the powder, to approximately 37% in the final product due to carburation and formation of cubic SiC in situ. For a 100% pore-filling the value 4.7 of the above ratio means that no carburation has taken place, whereas the value 6.2 shows that the whole amount of silicon in excess has been converted into SiC.

From Test No. 29 it is found that the resistivity of the infiltrated body (5.5 ohms) is subject to great increase (up to 82 ohms) during 20 hours of annealing. On continued annealing the changes are irregular, and difficulty is encountered in obtaining reproducible values, particularly upon rapid cooling of the samples. This is due to the fact that annealed samples are subject to a delayed rate of change of resistivity which may be very important. In Test No. 29 the resistivity changes from 85 ohms to 260 ohms solely by the storage of the sample during 3 days at room temperature.

An examination of the sample under the microscope after the 60-hours annealing shows very clearly that the alloy contained in the filled pores had burst into a large number of minute particles of a diameter of approximately 10 microns. The initial particle size was about 100 to 200 microns.

The present embodiment of the invention enables the obtainment of a fine-grained alloy structure in the final product without any annealing of the product accompanied by irregular changes in its resistivity, and this result can be attained by the addition of certain metals. These form with the molybdenum silicide mixed silicides which will give rise to the formation of a second phase. Thereby the metal silicide will be composed of two phases, the one being $MoSi_2$ and the other being the mixed silicide. It can be seen from the table that the extra metallic additions, although in varying degrees, involve that the irregular rate of change of the resistivity is avoided.

An additition of from 1 to 15%, preferably 5%, of Cr (Test No. 18) is particularly advantageous in that the resistance to oxidation will be maintained or improved and at the same time resistivity changes after annealing will be unnoticeable.

*Section 12.—Use of unsintered preliminary bodies for infiltration*

Further investigations carried out by the applicant have shown that, quite surprisingly, the production of compact bodies according to the basically described embodiment of the invention can be highly simplified, if the production of the porous preliminary body and the infiltration process are carried out in two combined annealing stages forming part of one and the same furnace process.

The annealing operations required according to the basic embodiment of the invention both in the production of the preliminary shaped body and in the infiltration process must be carried out at very high temperatures and are responsible for a considerable part of the cost of production of the compact bodies or articles according to the invention. Now it has been found, quite surprisingly, that it is possible to carry out both the manufacture of the porous preliminary body and the infiltration process in one single annealing operation. The process according to this further development of the present invention basically resides in that a powder mixture, preferably consisting of exclusively silicon carbide together with temporary binders, is shaped, then embedded in a powder of a silicious alloy, and finally heated in a manner to cause the silicon carbide particles to sinter together and recrystallize into the pores of the preliminary body thus produced takes place.

According to a preferred embodiment of the present development of the invention, the annealing operation is carried out in an atmosphere containing carbon monoxide which is produced due to incomplete combustion of the graphite or carbon element serving as furnace tube. In this case, during the infiltration process a reaction will take place between the infiltrating alloy and the carbonaceous atmosphere and will cause formation of silicon carbide in situ.

Thus, in the last-described embodiment, no less than three distinguished processes will take place during one single annealing operation, namely, first, a sintering of the silicone carbide particles into a porous preliminary body, second, an infiltration with the silicious alloy, and, third, a partial formation in situ of silicon carbide particles within the infiltrating alloy. Therefore, the process according to this development will enable a considerably reduced cost of production, and at the same time the obtainment of products having more advantageous characteristics. The last-mentioned condition, which must also be characterized as surprising, would be caused by the fact that the process almost completely avoids the difficulties encountered in association with the heating and cooling-down, respectively, of the furnace and which involve that the control of the protective atmosphere will be insufficient. A particular problem in this connection, inter alia, resides in the harmful formation of oxygen containing secondary products which may take place upon carburizing solid silicious alloys in CO at temperatures below approximately 1650° C. Such formation need not take place when performing the process according to the present embodiment of the invention.

EXAMPLE 30

Green silicon carbide having a grain size of 800 mesh was mixed with 3% waterglass (38° Bé.) and was pressed into a small rod of the dimensions 100 by 6 by 5.5 mm. After drying the weight of the rod was 6.0 g. The dried rod was embedded in a surrounding layer of uniform thickness of a powder mixture containing 80 parts of $MoSi_2$, 20 parts of silicon and 5 parts of chromium powder by weight. The particle size of the molybdenum disilicide was less than 10 microns, while those of the silicon and chromium powders were less than 50 microns. The rod was placed together with its surrounding powder layer, 7 g., in a graphite crucible and was heated during 15 minutes at 2000° C. After the annealing step the weight of the rod was found to have increased by 4.9 g., i.e. by 82%. On a micrograph of the infiltrated body with a linear enlargement of 500 times it was found that the wetting between silicon carbide and alloy is extraordinarily good, and no pores whatever could be detected. Since the silicon carbide was not grain-graded but had a fairly uniform grain size of 10 to 15 microns, the pores of the preliminary body, and thus the silicide particles, were found to be comparatively large, having a maximum diameter of approximately 15 microns.

EXAMPLE 31

In a further example an initial silicon-carbide material in the form of 800 mesh green silicon carbide was used which had been reduced to a maximum grain size of approximately 8 microns by wet-grinding in a hard-metal mill during 72 hours. In every other respect the production process was carried out as in Example 30 and resulted in a body, of the same appearance, although having considerably smaller silicide particles in the final product.

EXAMPLE 32

As an example the manufacture on a full industrial scale of an electric resistance element according to the invention will now be described in detail. This element can be used also in oxidizing atmosphere up to 1550° C. without ageing. The element is made as an integral body but is composed, as explained below, by a central incandescent zone 21 and two terminal zones 22a and 22b having a lower specific resistance whereby special cooling devices for the terminal zones will be superfluous.

The manufacture is subdivided in the following steps each of which will be treated individually. Reference is made to FIGURE 1 of the drawing.

Preparation of a mass for extrusion of silicon carbide.
Extrusion and drying of rods of silicon carbide.
Preparation of alloy powder.
Packing of the silicon carbide rods in alloy powder.
Infiltration.
The oxidizing final sintering step and control.

To further explain the processes taking place during infiltration also the following report has been added concerning:
Balance of material.

*Preparation of a mass for extrusion of silicon carbide*

Green coarse crushed silicon carbide was further crushed and sieved until all of it had passed a sieve of 325 mesh. The crushing was performed in an edge mill. The powder was mixed a few hours in a kneader with an aqueous solution of an organic glue substance on the basis of cellulose ester which is called Modocoll M (a registered trademark) by the manufacturer, the Swedish corporation Mo & Domsjö Aktiebolag. The quantity of dry glue substance was 3.5% by weight of the silicon carbide and the additional water was 8 litres per kilogram of glue. The mixing was made at 50° C. which resulted therein that the water content was gradually reduced in the course of mixing. When the water content was reduced to about 8% of the weight of the mass the consistency had been suitable for the continued treatment and the mixing was interrupted. The mass was transferred to a vacuum mill in which it was subjected to a pressure of 20 millimeters Hg and forced to form a cylinder having a diameter of 50 millimeters.

*Extrusion and drying of rods of silicon carbide*

The pressed-out cylinders were introduced into a piston press and pressed out into long rods having a diameter of 8 millimeters. The rods were cut into lengths of 400 millimeters which corresponds to the final dimensions of the finally made resistance element. The humid rods were dried in a climatic box at 40° C. and afforded then such a good green strength that they could stand, without any loss of substance, the continued treatment according to the description below. The volumetric weight of the rod was 2.24 gram/cm.$^3$ of which about 3.5% is glue and the balance i.e. about 2.17 gram/cm.$^3$ silicon carbide. From this one may calculate that the silicon carbide skeleton of the dried rods contained about 35% pores. The object of the infiltration step now following is to fill out such pores or interstices entirely or to a substantial portion with an alloy having the composition $MoSi_2$.

The glue substance in the dried shaped body is decomposed during the infiltration and leaves a small quantity of carbon which, however, is transformed into silicon carbide.

Preparation of alloy powder

Molybdenum disilicide which in known manner is manufactured by exothermic reaction between the elements is crushed and milled in gasolene in a hard-metal mill. After milling for 96 hours the desired grain size had been obtained meaning that all of the material had a grain size less than 10 microns. Of the disilicide powder 80 parts by weight were mixed with 20 parts by weight of a 99% pure silicon having a grain size less than 325 mesh and with 5 parts by weight chromium powder also having a grain size less than 325 mesh. Upon the evaporation of all gasolene the powder mass was mixed in dry state.

Packing of the silicon carbide rods in alloy powder

The dried rods were packed in powder in a manner illustrated in FIG. 1. Each rod of length of 400 millimeters was provided with a coating of a powder in such a way that the central zone 5 had a length of 200 millimeters and a coating 6 of 1.5 millimeter, whereas two terminal zones 7 being 100 millimeters long had a coating 8 of about 2 millimeters of thickness. To obtain a great accuracy the powder quantities were weighed up for the different zones taking into account the rule that the thinner coating is to constitute 80% and the thicker coating 120% of the weight of the uncoated rod in the corresponding zone. In the manufacture on a large scale it is preferable to press the desired quantity of powder to tubular pieces which, upon being dried, are thrust on the rod. It is then easy to obtain an exact adjustment of the powder quantity available for each zone. When the rod has been provided with powder it is packed in a layer of thick paper 9 and is then prepared for infiltration.

Infiltration

The rods being coated and wrapped in paper are placed in bundles of three in a graphite tube 10, the mutual positions of the rods being seen in FIG. 1. The graphite tubes had a length of 500 millimeters and a wall thickness of 4 millimeters. Before each infiltration about 10 gram graphite powder was applied on the inside of the graphite tubes which were then rotated a few revolutions. The reason for this step is that carbon is consumed in the process which carbon must be taken from the inside of the graphite tubes. If graphite is thus supplied additionally the same tube may be used practically for any length of time unless they are broken by accident. On the other hand, if a graphite powder is not added, the infiltration process will be disturbed seriously already after the first use of a new graphite tube. The graphite tubes with their content of three coated rods are then placed in a graphite tube furnace. Preferably the three tubes are placed in the furnace in parallel with one another in similar manner as the three rods. The furnace will thus contain nine rods. However, also a greater number of tubes may be placed in the furnace, for instance, seven tubes in tight packing which results in a production of twenty-one rods for each burning step.

The graphite tubes are placed horizontally in the furnace which is then provided with graphite plugs at their ends. These must not seal the ends quite tightly because the carbon oxide formed must have its free exit. No special protective gas is required but in the production on a large scale it may be found suitable to conduct the current of carbon monoxide through the furnace. To avoid overheating of those portions of the coated rods which are positioned close to the furnace tube it is desirable that the inner graphite tubes do not touch the furnace tube directly but are held by distance pieces at the outer ends of the tube at a distance of about 5 millimeters from the wall of the furnace tube. This has a length of 1000 millimeters and a wall thickness of 5 millimeters in the incandescent zone being of a length of 500 millimeters. The two terminal zones have a length of 250 millimeters each and a wall thickness of 10 millimeters. The furnace is cooled with the aid of a plate jacket with water.

The furnace tube is connected to a transformer of 50 kva. The temperature will be increased in 45 minutes to 2000° C. and is maintained at that temperature for 15 minutes. The temperature measurement is made optically through an aperture in the one plug at the end of the furnace tube. Due to the development of smoke and gas during the action an exact temperature control is very difficult to establish. By observing the setting of the transformer from one test to another the necessary exactness as regards the temperature may be assured also in the production on a large scale. The reading off may be assumed to be so uncertain that the actual temperature during infiltration may vary between the limits 1900 and 2100° C. When the furnace has cooled off which lasts for about 60 minutes the tubes are removed, the rods cleaned by a brush and are then ready for a continued treatment.

The quantity of powder available for infiltration has a considerable influence on the properties of the infiltrated product. The more powder is added the more alloy will be absorbed. The alloy is evenly distributed in the porous carbide body and is thus not concentrated to the surface thereof in case the powder quantity has been insufficient for a complete infiltration. The connection between the used quantity of powder and the absorbed quantity of alloy will be seen in FIG. 8. It has been found that the absorption is increased in proportion to the powder quantity up to a sharply pronounced limit. If further powder is added the absorbed quantity of alloy will be constant as the pores are then practically entirely filled out. The excess of powder remains as a porous slag on the outside of the infiltered rod and the whole aggregate is surrounded by a thin tube of silicon carbide which confines each rod against adjacent rods. This carbide tube has been produced through the reaction of silicon on the paper in which the rods have been wrapped. Due to the formation of the carbide tube it is possible to burn several rods in the manner above described at the same time without losing any exactness as regards the quantity of alloy absorbed.

The oxidizing final sintering step and control

The cleaned rods contain at least in their central incandescent zones through-going pores which must be sealed before the rods can be used for their purpose. The rods are first placed in furnaces and heated in air for about 100 hours at 1500 to 1550° C. The weight of the incandescent zones of the rods is then increased due to the formation of quartz glass which seals the pores and also forms a protecting coating on the surface of the element. Another consequence is that the resistance is increased. The resistance of the central incandescent zone portion at 1500° C. increased already after a heating for 24 hours from 190 to 210 ohm/mm.$^2$/meter but remained then substantially constant at a continued heating. The resistance of the outer zones increased by the same treatment from 22 to 25 ohms.

Upon the heating in air of the element its resistance in hot condition was controlled and such elements which have their resistance values falling within predetermined limits are provided with metallized contacts and are then ready for use. It is also possible to carry out the oxidation in direct connection with the controlled measurement by letting electric current traverse the element.

Balance of material

The reactions taking place in the infiltration are rendered clear in the best way by establishing a balance of material. In order not to complicate the calculations too much, below the infiltration of such rods will be described which throughout correspond to the terminal zones in the above described element and which thus are completely infiltrated. To obtain a great exactness the test comprised the infiltration of three rods each having a length of 400 millimeters. Before the infiltration the weight of the rods was 122 grams. They were packed in 144 grams of alloy powder. After the reaction the weight of the rods had increased to 205 grams whereas the remaining powder balance was 32 grams. This balance was analyzed and found to contain 35.2% Mo, 3.6% Cr, 47.5% Si, 11.8% C and the remainder impurities. The infiltrated rods had the following compositions: 16.8% Mo, 2.5% Cr, 59.0% Si, 20.0% C and the remainder impurities.

As regards the process of infiltration the following balance of material could be established, all the figures denoting the total weight in grams.

|  | Incoming | | | | | Total | Outgoing | | | | | Total |
|---|---|---|---|---|---|---|---|---|---|---|---|---|
|  | Mo | Cr | Si | C | Impurities |  | Mo | Cr | Si | C | Impurities |  |
| Dried carbide rods | | | 83 | 36 | 3 | 122 | | | | | | |
| Alloy powder | 68 | 7 | 68 | | 1 | 144 | | | | | | |
| Carbon absorbed from atmosphere | | | | 8 | | 8 | | | | | | |
| Rods infiltrated | | | | | | | 35 | 5 | 123 | 40 | 2 | 205 |
| Remaining powder | | | | | | | 11 | 1 | 15 | 4 | 1 | 32 |
| Losses (vapor and smoke) | | | | | | | 22 | 1 | 13 | | 1 | 37 |
| Total | 68 | 7 | 151 | 44 | 4 | 274 | 68 | 7 | 151 | 44 | 4 | 274 |

The total volume of the original rods including the pores amounts to 56 cm.³ which means that the volumetric weight was 2.16. From this it is calculated that 32% or 18 cm.³ of the pores are available for infiltration. After the infiltration there was found in the pore cavities 15 grams of newly formed silicon carbide and 68 grams of a mixed silicide, the composition of which, disregarding a small excess of silicon, may be written $(Mo_{0.8}Cr_{0.2})Si_2$. The volume of these pore filling substances is totally 16 cm.³. From this it can be calculated that the remaining pores constitute 2 cm.³ or 3 percent by volume. It is of interest to ascertain that about 10% of the silicon carbide of the infiltrated body is formed in situ through carburization of silicon. Of the 8 grams of carbon absorbed, about one half is consumed for this formation of SiC within the body whereas the second half is consumed for the formation of SiC in the powder remainder outside the body. The latter formation of SiC is very important, because it is a condition for producing an even surface of the infiltrated product. As soon as the carburization of the remaining powder is disturbed there will be a kind of burr produced on the surface of the bodies and it may be difficult to remove this burr entirely by mechanical means. It has, however, been found to be possible to remove this burr by repeated burning at 2000° C. in CO gas, said burr then being transferred to a loose powder substantially of silicone carbide. If the atmosphere contains a sufficient quantity of carbon monoxide the quantity of alloy powder has no influence on the formation of burr and, without the slightest inconvenience, more than twice the required quantity of powder may be used.

Only 50% of the molybdenum added is utilized whereas the remainder is lost. A considerably better result will be obtained if carbon monoxide is used as a protective gas during the entire infiltration. It may also be suitable to prevent the oxidation of the alloy powder while preparing it as described above. The oxidation causes a formation of $SiO_2$ which escapes during the infiltration in the form of SiO. Even if the silicon losses are without any great importance as regards economy it is important for the process that the silicon content is maintained under careful control during the process, because only hereby it is possible to obtain that constant composition which in many cases is desirable in the final product.

EXAMPLE 33

In the preceding example the manufacture of a resistance element has been described in which the incandescent zone had a higher resistance than the terminal portions due to the fact that it had been infiltrated incompletely. After the remaining pores of the incandescent zone had been filled out with quartz glass during the oxidizing final sintering the element shown in FIG. 3 was obtained as a final product. However, there are also other possibilities to produce different resistances in the infiltrated material. FIG. 4 shows another element having a constant thickness and manufactured by a special joining operation. Such an operation is illustrated in FIGURES 2A to 2E, inclusive.

A porous dried rod 11a (FIGURE 2A, which is intended to be the incandescent zone is manufactured in the same way as that illustrated in FIG. 1, thus starting with silicon carbide having a particle size of 325 mesh and glue. Another porous dried rod 11b (FIGURE 2A) is manufactured in similar manner but of a mixture of equal parts of silicon carbide of 800 mesh and $MoSi_2$ of ten microns particle size and glue. Both rods are ground as may be seen from the figure and provided with a peg 12b (FIGURE 2B) and a bore 12a (FIGURE 2B) just fitting thereto. The grinding of the dried mass is very simple to carry out. Then the peg and the walls of the bore are moistened with a glue solution and rubbed for about one minute against one another until a good contact is obtained. The binding layer 14 (FIGURE 2D) between the two rods consists now of uniform material of high viscosity. When this has dried there has been established a homogenous transition 15 (indicated in FIGURE 2E) between the rods. The opposite ends of the incandescent zone blank is provided in a similar manner with a terminal portion and the rod composed of three parts is infiltrated as indicated in FIG. 1 but with the difference that the entire rod will now be completely infiltrated and the powder layer will in this case have to be of uniform thickness. The final product is shown in FIG. 4, in which, however, a pair of outer terminals 16 of $MoSi_2$ have been secured by welding to inner terminal portions 17. Such a welding is possible because the terminals 17 contain about 60% by volume $MoSi_2$ and only 40% by volume SiC. On the other hand, the material of the incandescent zone 18 having its recrystallized rigid skeleton cannot be welded to the terminal material or to $MoSi_2$.

FIGS. 5 and 6 illustrate two elements of hairpin shape which are manufactured in principally the same way as the elements according to FIGS. 3 and 4 respectively. In FIG. 5 the incandescent zone 24 is bent and its ends are joined with the terminal portions 25. In FIG. 6 the bent rod 19 consists of $MoSi_2$ whereas the inner and outer terminals 20 have been joined to the incandescent zone 21 according to the method above described.

EXAMPLE 34

Still another way of establishing cooler ends in electric heating elements will be clear from the following description.

An extruded rod of the same composition as disclosed in Example 32 is dried and the central section impregnated with a carbon containing carbonizable liquid, such as furfurol. The composite rod is then packed in alloy powder as indicated in FIGURE 1. The plastic will be carbonized at an early stage of the infiltration process and the carbon formed in situ in the pores of the preliminary body will upon infiltration be completely transformed into SiC. The amount of silicon alloy in the final rod will thus be lower in the central section than in the ends. The greater consumption of silicon in the central section has to be compensated for by using an alloy powder around the central section with a higher content of silicon than in the alloy powder for infiltration of the ends.

I claim:

1. A dense oxidationproof heat-resistant heating element, having a heating zone formed of 30–90% by volume recrystallized silicon carbide and being impregnated with 10–70% by volume of a refractory alloy, the refractory alloy being principally molybdenum disilicide said impregnation being substantially complete and any overall porosity of said heating zone being at most 3% by volume and said heating zone being heat-resistant in air at temperatures of at least 1550° C.–1600° C.

2. A body as claimed in claim 1 having a heating zone formed of 40–85% by volume recrystallized silicon carbide.

3. A body as claimed in claim 1 wherein the refractory alloy includes at least one silicon alloy of a member of the group consisting of W, Cr, Ta, Nb, V, Hf, Zr and Ti and at least one member of the group consisting of Al, Be, Ca, Ce, Co, Cu, Mg, Fe, Mn, Ni, C and B.

4. A body as claimed in claim 1 including up to 20% by volume of an oxide component including at least one oxygen compound of elements from the group consisting of Al, Be, Ce, Cr, Hf, Mg, Ti, Si, Zr, Th, Y and other rare earth metals.

5. A body as claimed in claim 3 wherein the silicon alloys of metals other than molybdenum amount to 1–15% by weight of the refractory alloy.

6. A body as claimed in claim 1 including a thin external layer of quartz glass.

7. A heating element as claimed in claim 1 in which the heating zone is in the form of a hollow cylinder.

8. A body as claimed in claim 7 wherein said hot zone is between cold ends impregnated with molybdenum disilicide.

9. A body as claimed in claim 8, the proportion of molybdenum silicide in the cold ends being greater than in the hot zone.

10. A hollow cylindrical electrical heater bar of the type having a hot zone for use in high temperature furnaces, wherein said bar is formed of 40–85% by volume of recrystallized silicon carbide and said hot zone is impregnated with molybdenum disilicide said impregnation being substantially complete and any overall porosity of said hot zone being at most 3% by volume and said hot zone being heat-resistant in air at temperatures of at least 1550° C.–1600° C.

11. A heat-resistant and oxidation-proof, substantially dense body consisting essentially of SiC, and $MoSi_2$, said SiC forming a recrystallized skeleton and said $MiSi_2$ filling the pore spaces in said skeleton, the composition of the body being 30 to 90% by volume SiC, and 10 to 70% by volume of $MoSi_2$, the grain size of said $MoSi_2$ being as an average not higher than 10 microns, and the particle size of said SiC being between 60 and 1200 mesh, said body being heat-resistant in air at temperatures of at least 1550° C.–1600° C.

12. A heat-resistant and oxidation-proof, substantially dense body consisting essentially of SiC, and $MoSi_2$, said SiC forming a recrystallized skeleton and said $MoSi_2$ filling the pore spaces in said skeleton, the composition of the body being 30 to 90% by volume SiC, and 10 to 70% by volume of $MoSi_2$, said body being heat-resistant in air at temperatures of at least 1550° C.–1600° C.

13. The body of claim 11, said body being rod-shaped and composed of at least two integral sections the one having a higher percentage of SiC and a lower percentage of $MoSi_2$ than the other section.

14. A heat-resistant and oxidation-proof substantially dense body consisting essentially of SiC and a silicon boride, said SiC forming a recrystallized skeleton and said silicon boride filling the pore spaces in said skeleton, the composition of the body being 30 to 90% by volume SiC and 10 to 70% by volume of silicon boride, said boride consisting of 10 to 70% by weight silicon, the balance being essentially boron, the grain size of said silicon boride being as an average not higher than 10 microns and the particle size of said SiC being between 60 and 1200 mesh.

References Cited by the Examiner

UNITED STATES PATENTS

| | | | |
|---|---|---|---|
| 1,906,963 | 5/1933 | Heyroth | 338—330 |
| 2,001,297 | 5/1938 | Boyles | 338—330 |
| 2,207,558 | 7/1940 | Singer | 338—330 X |
| 2,412,373 | 12/1946 | Wejnarth | 252—516 |
| 2,431,326 | 11/1947 | Heyroth | 252—516 |
| 2,445,296 | 7/1948 | Wejnarth | 252—516 |
| 2,637,091 | 5/1953 | Nicholson | 264—65 X |
| 2,766,141 | 10/1956 | Nicholson | 264—65 X |
| 2,883,708 | 4/1959 | Sem | 264—29 |
| 2,907,972 | 10/1959 | Schildhauer et al. | 252—516 X |
| 2,913,695 | 11/1959 | Borghult et al. | 252—516 X |
| 2,941,962 | 6/1960 | Beck | 252—516 X |
| 2,984,807 | 5/1961 | Blum | 338—330 |

RICHARD M. WOOD, *Primary Examiner.*

V. Y. MAYEWSKY, *Assistant Examiner.*